(12) United States Patent
Hasegawa

(10) Patent No.: US 12,155,802 B2
(45) Date of Patent: Nov. 26, 2024

(54) IMAGE FORMING APPARATUS, CONTROL METHOD, AND STORAGE MEDIUM

(71) Applicant: CANON KABUSHIKI KAISHA, Tokyo (JP)

(72) Inventor: Kiwamu Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 17/506,067

(22) Filed: Oct. 20, 2021

(65) Prior Publication Data
US 2022/0131983 A1   Apr. 28, 2022

(30) Foreign Application Priority Data
Oct. 28, 2020   (JP) .................. 2020-180572

(51) Int. Cl.
*H04L 9/32* (2006.01)
*H04N 1/00* (2006.01)
(Continued)

(52) U.S. Cl.
CPC ......... *H04N 1/0088* (2013.01); *H04L 9/3236* (2013.01); *H04N 1/32144* (2013.01);
(Continued)

(58) Field of Classification Search
CPC ....... H04L 9/3236; H04L 9/50; H04L 9/3297; H04N 1/0088; H04N 1/32144; H04N 1/32283; H04N 2201/3246; H04N 1/32229

See application file for complete search history.

(56) References Cited

U.S. PATENT DOCUMENTS 9,855,785 B1 * 1/2018 Nagelberg ....... G06K 19/06028
10,121,025 B1 * 11/2018 Rice .................... G06F 21/10
(Continued)

FOREIGN PATENT DOCUMENTS

EP    3673391 A2 *  7/2020  ........... B42D 25/333
JP    2018128823 A    8/2018
(Continued)

OTHER PUBLICATIONS

Z. Meng, T. Morizumi, S. Miyata and H. Kinoshita, "Design Scheme of Copyright Management System Based on Digital Watermarking and Blockchain," 2018 IEEE 42nd Annual Computer Software and Applications Conference (COMPSAC), Tokyo, Japan, 2018, pp. 359-364, doi: 10.1109/COMPSAC.2018.10258. (Year: 2018).*

(Continued)

*Primary Examiner* — Joseph P Hirl
*Assistant Examiner* — Thomas A Gyorfi
(74) *Attorney, Agent, or Firm* — Canon U.S.A., Inc. IP Division

(57) ABSTRACT

An image forming apparatus that cooperates with a management service and a blockchain service includes a generation unit that generates an embedded image from document information about a document, an acquisition unit that acquires an embedding setting for use in embedding the embedded image in the document, a printing unit that performs printing of the document with the embedded image embedded therein based on the embedding setting, and a registration unit that registers the document information with the blockchain service, wherein, while the embedding setting includes a setting for embedding a plurality of embedded images in the document and the printing unit outputs a printed product with a plurality of embedded images embedded therein, the registration unit registers the (Continued)

document information with the blockchain service in such a way as to prevent the document information from being registered in an overlapping manner in registering the document information.

10 Claims, 24 Drawing Sheets

(51) Int. Cl.
  *H04N 1/32* (2006.01)
  *H04L 9/00* (2022.01)
(52) U.S. Cl.
  CPC ........... *H04N 1/32283* (2013.01); *H04L 9/50* (2022.05); *H04N 2201/3246* (2013.01)

(56) References Cited

U.S. PATENT DOCUMENTS

| | | | | |
|---|---|---|---|---|
| 10,855,868 | B1 * | 12/2020 | Wushour | ........... H04N 1/32149 |
| 10,893,156 | B1 * | 1/2021 | Moua | ................. H04N 1/00538 |
| 11,847,193 | B2 * | 12/2023 | Bliss | ..................... G06F 16/245 |
| 2015/0063625 | A1 * | 3/2015 | Martin | ............... H04N 1/32304 |
| | | | | 382/100 |
| 2021/0019432 | A1 * | 1/2021 | Sato | ........................ H04N 1/444 |
| 2021/0073369 | A1 * | 3/2021 | Fan | .......................... G06F 21/44 |
| 2022/0045869 | A1 * | 2/2022 | Skeete | ................. G06K 7/1417 |

FOREIGN PATENT DOCUMENTS

| | | | | | |
|---|---|---|---|---|---|
| JP | 2021114651 | A | * | 8/2021 | ........... G06F 21/602 |
| KR | 102545407 | B1 | * | 6/2023 | ............. G06F 21/34 |
| WO | WO-2016189488 | A2 | * | 12/2016 | ........ G06F 17/30011 |
| WO | WO-2020161510 | A1 | * | 8/2020 | ........... G06Q 20/042 |

OTHER PUBLICATIONS

English langauge translation of JP-2021114651 (26 pages) (Year: 2021).*

English language translation of KR-102545407-B1 (26 pages) (Year: 2019).*

* cited by examiner

FIG.10A1

■ DOCUMENT PRINTING

Please select a file to print.

| Document A | 2020/09/23 | 12:00:00 |
| Document B | 2020/09/24 | 13:00:00 |
| Document C | 2020/09/25 | 12:30:00 |

BC REGISTRATION  [ Do ]  [ Not do ]
COLOR SELECTION  [ Color ]  [ Monochrome ]
PAPER SELECTION  [ A3 ]  [ A4 ]  [ B5 ]

[ CANCEL ]                    [ PRINT START ]

FIG.10A2

■ DOCUMENT PRINTING

Please select a file to print.

BC FUNCTION SETTING                EMBEDDING POSITION

NUMBER OF EMBEDDING PORTIONS:  [ 5 ]
* ENTERABLE NUMBER RANGE 5 (default) - 6

[ EMBEDDING POSITION SETTING ]

[ BACK ]  [ OK ]                    ◀ 1/3 ▶

[ CANCEL ]                    [ PRINT START ]

FIG.10A3
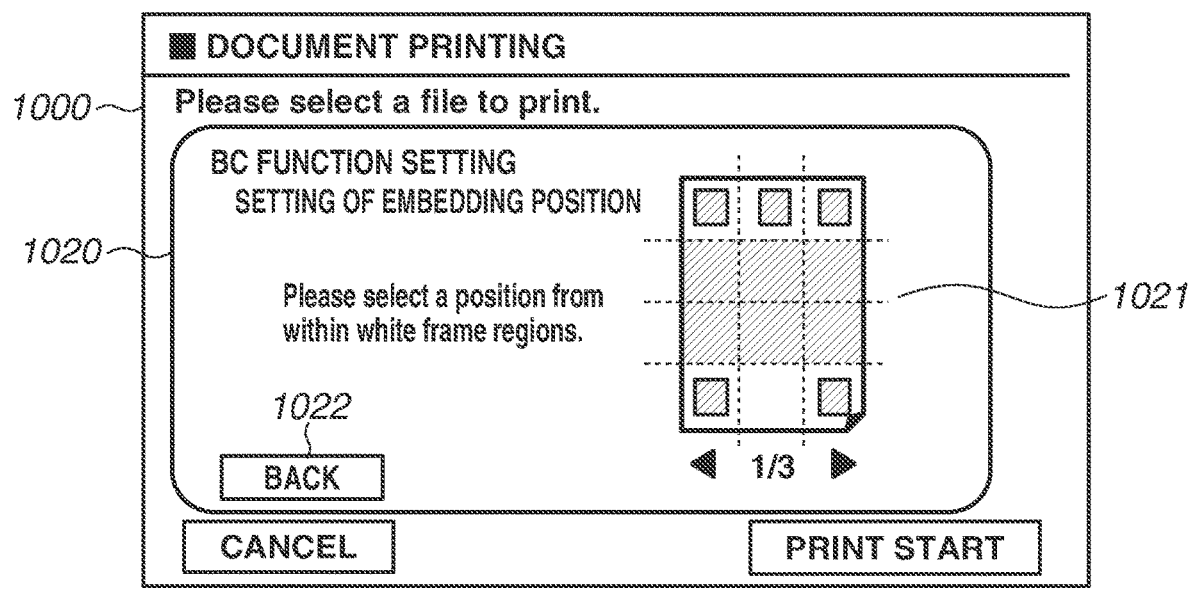

FIG.10B1
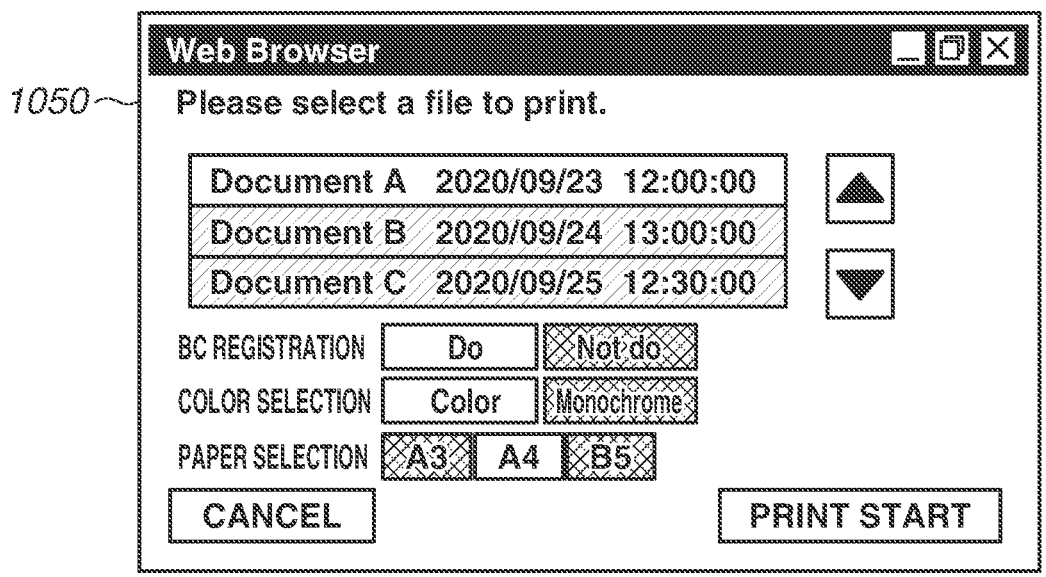
FIG.10B2
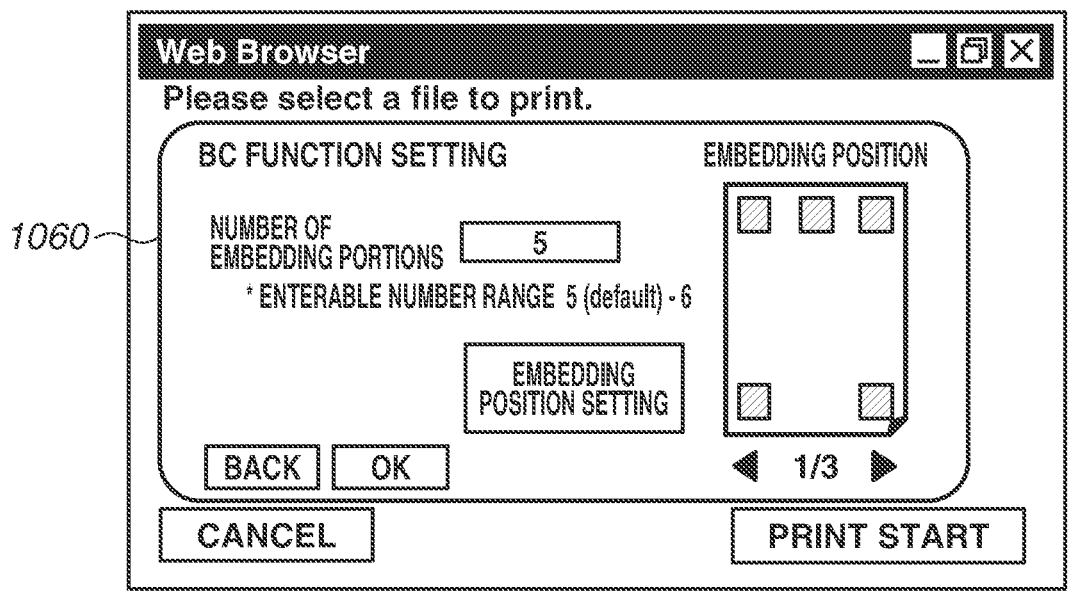

FIG.10B3
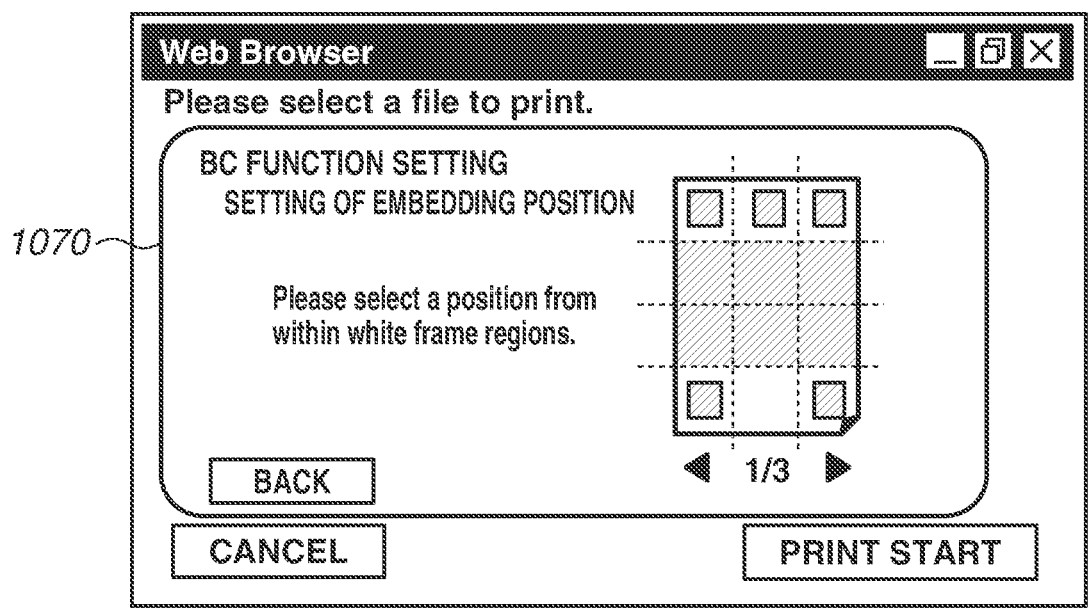

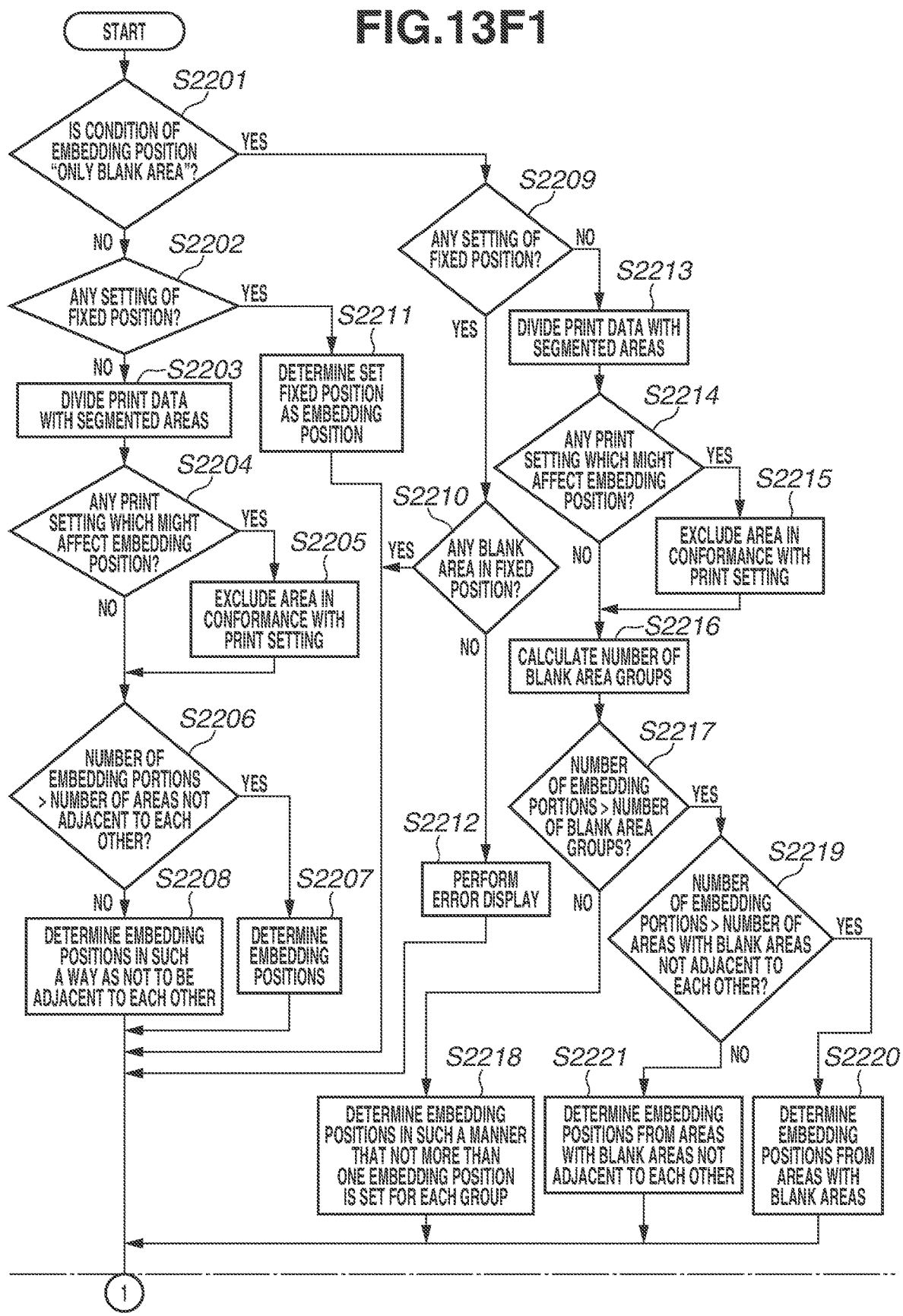
FIG.13F1

FIG.13F2
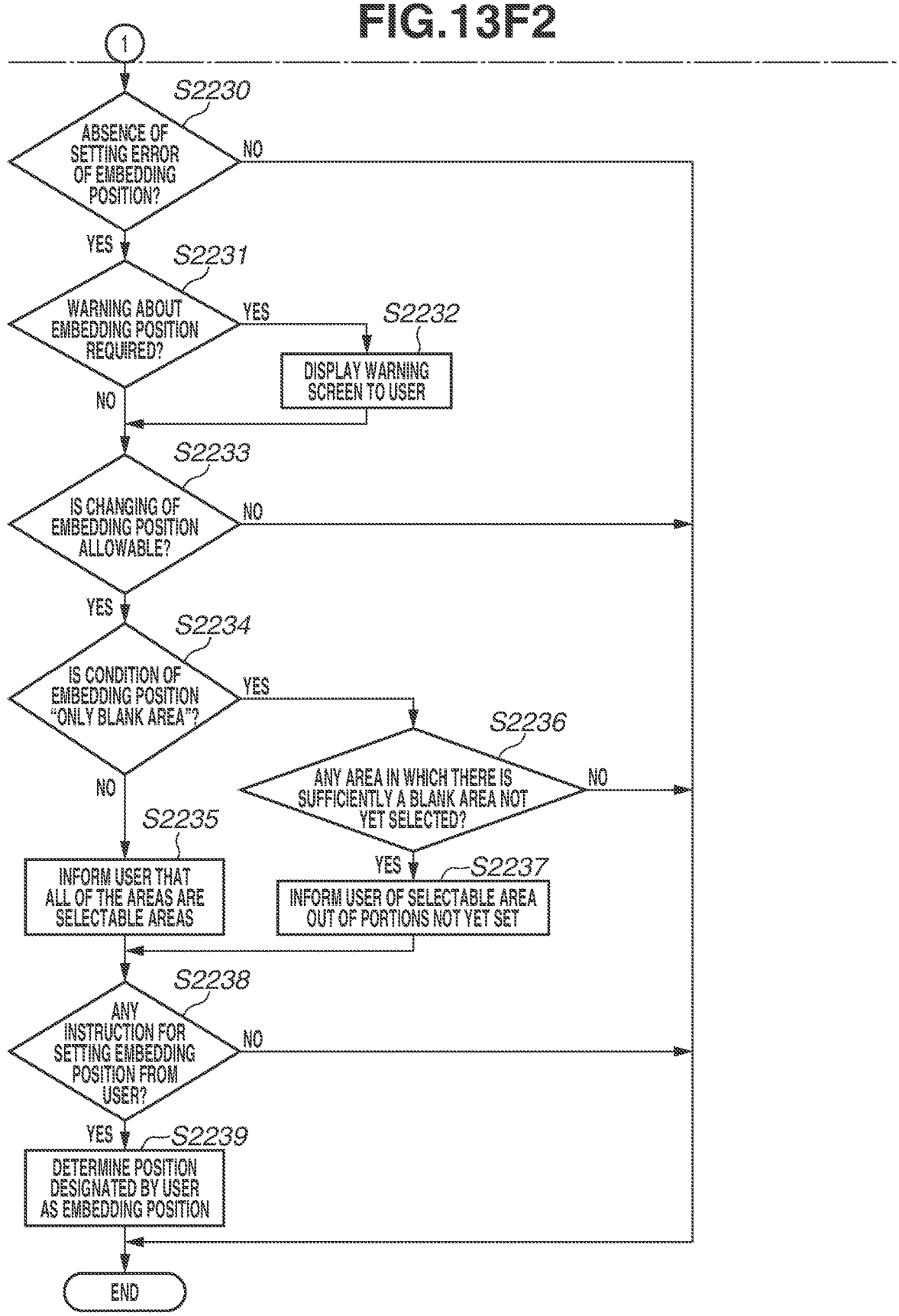

IMAGE FORMING APPARATUS, CONTROL METHOD, AND STORAGE MEDIUM

BACKGROUND

Field of the Disclosure

Aspects of the present disclosure generally relate to a technique capable of coping with tampering of records of electronic data with use of a blockchain.

Description of the Related Art

There is a known technique to, for the purpose of preventing tampering of an electronic file, insure the reliability of changes in content of the electronic file by using a blockchain, as discussed in Japanese Patent Application Laid-Open No. 2018-128823.

When an image forming apparatus equipped with a scanner and a printer performs scanning or printing, an electronic file is relevant thereto. While the case of registering information about such an electronic file with a blockchain service is conceivable, how the image forming apparatus cooperates with the blockchain service has still not been considered.

SUMMARY

Some aspects of the present disclosure are generally directed to providing an image forming apparatus which cooperates with a blockchain service and reducing the possibility of information registered with the blockchain service recorded on a printed product becoming unable to be read when the printed product is scanned.

According to some aspects of the present disclosure, an image forming apparatus that cooperates with a management service which receives a document via a network and stores the document and a blockchain service which manages document information about the document on a block-by-block basis and, upon defining association of each block with a previous and/or subsequent block, manages a plurality of blocks with a plurality of nodes includes a generation unit configured to, in printing a document stored in the management service, generate an embedded image from document information about the document, an acquisition unit configured to acquire an embedding setting for use in embedding the embedded image in the document, a printing unit configured to output a printed product with the document information recorded thereon by performing printing of the document with the embedded image embedded therein based on the embedding setting, and a registration unit configured to register the document information with the blockchain service in conjunction with the printed product being output, wherein, while the embedding setting includes a setting for embedding a plurality of embedded images in the document and the printing unit outputs a printed product with a plurality of embedded images embedded therein, the registration unit registers the document information with the blockchain service in such a way as to prevent the document information from being registered in an overlapping manner in registering the document information in conjunction with the printed product with a plurality of embedded images embedded therein being output.

Further features of various embodiments will become apparent from the following description of exemplary embodiments with reference to the attached drawings.

BRIEF DESCRIPTION OF THE DRAWINGS

FIGS. 10A1, 10A2, and 10A3 are diagrams illustrating examples of document printing screens for an application A.

FIGS. 10B1, 10B2, and 10B3 are diagrams illustrating examples of document printing screens for the application A.

FIGS. 13F1 and 13F2 are flowcharts illustrating processing for printing a document by the image forming apparatus.

DESCRIPTION OF THE EMBODIMENTS

In cooperation between an image forming apparatus and a blockchain service, there is a method of registering information about a printed product with the blockchain service. Specifically, there is a method of previously registering information capable of indicating uniqueness for each printed product with a blockchain service and, after that, embedding, in a printed product, document information, i.e., inquiry information, for use in inquiring of the blockchain service about the presence or absence of registration of information. The information capable of indicating uniqueness for each printed product and the inquiry information can be separately managed and be treated in association with each other, or, if being in a one-to-one relationship, can be treated as identical to each other.

However, in the case of embedding inquiry information (or information capable of indicating uniqueness for each printed product) in a printed product, there may occur a case where the image forming apparatus becomes unable to read information embedded in the printed product. For example, there is a case where the embedded information is lost unintentionally due to the printed product itself being, for example, damaged, smeared, or deteriorated. Alternatively, there is a case where the embedded information is lost unintentionally due to noise being applied to the embedded information during reading thereof. Additionally, as another example, there is a case where information to be embedded in a printed product is treated as invisible information about extremely small dots, so that it may be impossible to ensure that information embedded by a certain manufacturer's image forming apparatus is able to be surely read by another manufacturer's image forming apparatus. If, as a result of these cases, information embedded in a printed product becomes unable to be read, it may become impossible to search whether information about the printed product is currently registered with the blockchain service.

Figure 1:
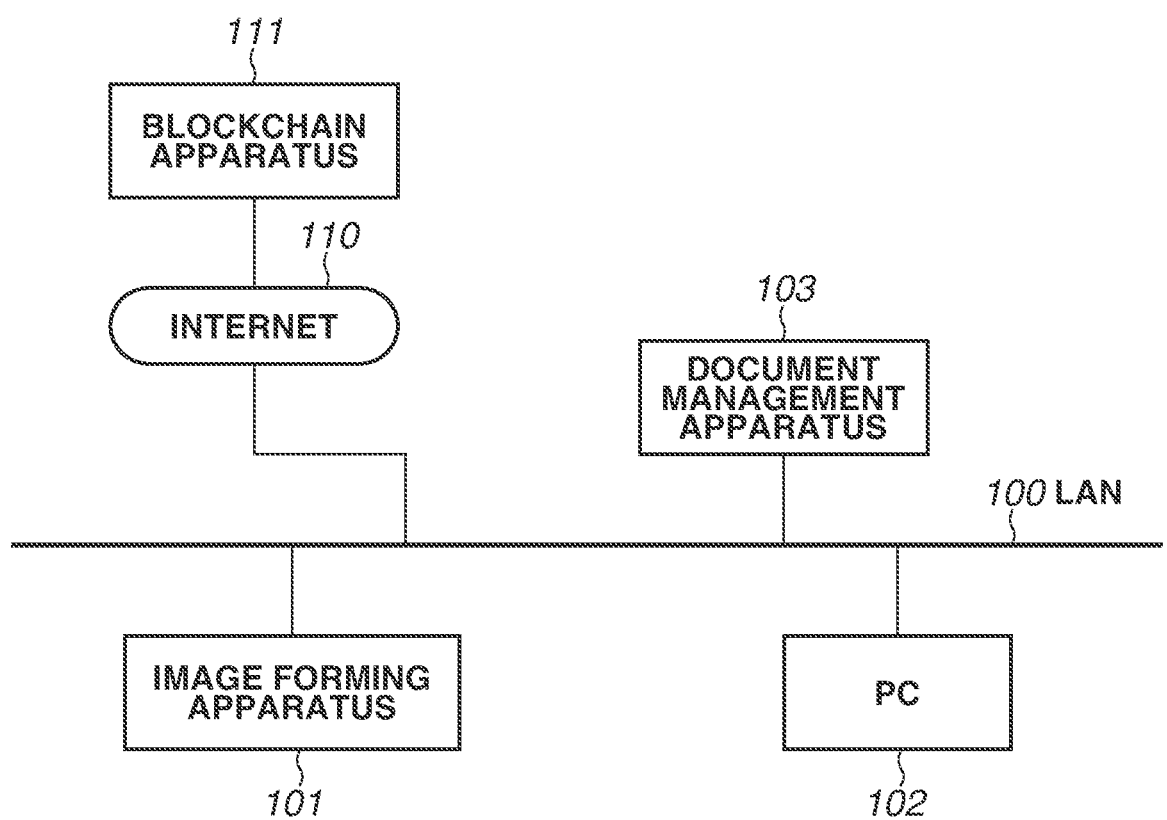
FIG. 1 is a diagram illustrating a configuration of a system.

In the following description, various exemplary embodiments, features, and aspects for solving such various issues will be described in detail with reference to the drawings. FIG. 1 is an overall view of a system associated with an image forming apparatus 101. The image forming apparatus 101, a personal computer (PC) 102, and a document management apparatus 103 are located in an intranet while being connected to a local area network (LAN) 100, and perform communication with a blockchain apparatus 111 via the Internet 110. The PC 102 is used to manage the image forming apparatus 101 with use of a web browser and to perform printing with the image forming apparatus 101 with use of a printer driver.

The blockchain apparatus 111 is an apparatus which collectively manages document information generated by the image forming apparatus 101 or the PC 102 on a block-by-block basis and is thus an apparatus which provides a blockchain service for insuring the validity of each document. The document management apparatus 103 is an apparatus which stores an electronic document generated by the image forming apparatus 101 or the PC 102 and is thus an apparatus which provides a document management service. A service which the blockchain apparatus 111 and the document management apparatus 103 provide can be provided as a cloud service, and, in that case, a configuration in which one apparatus obtained by virtualizing a plurality of computers provides a service can be employed.

Figure 2:
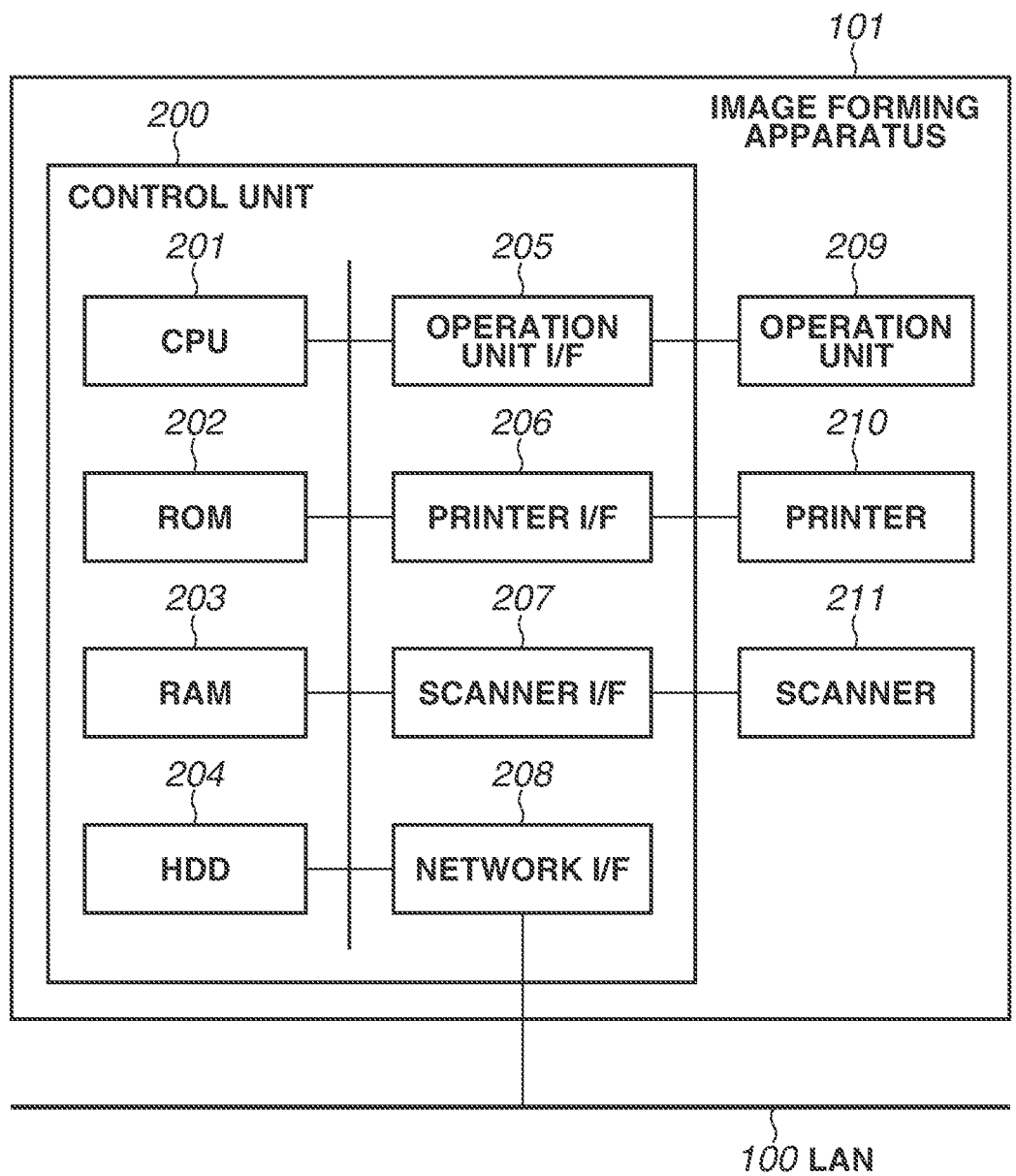
FIG. 2 is a diagram illustrating a hardware configuration of an image forming apparatus.

FIG. 2 is a block diagram illustrating a hardware configuration of the image forming apparatus 101. A control unit 200, which includes a central processing unit (CPU) 201, controls operations of the entire image forming apparatus 101. The CPU 201 reads out control programs stored in a read-only memory (ROM) 202 and performs various control operations, such as read control and transmission control, based on the control programs. A random access memory (RAM) 203 is used as a temporary storage region, such as a main memory and a work area, for the CPU 201. A hard disk drive (HDD) 204 stores image data and various programs or various pieces of data described below. The image forming apparatus 101 has a hardware configuration serving as an information processing apparatus and, in addition, further has the following hardware configuration.

An operation unit interface (I/F) 205 interconnects an operation unit 209 and the control unit 200. A printer I/F 206 interconnects a printer 210 and the control unit 200. Image data to be printed by the printer 210 is transferred from the control unit 200 via the printer I/F 206 and is then printed on a recording medium by the printer 210. A scanner OF 207 interconnects a scanner 211 and the control unit 200. The scanner 211 reads an image on an original to generate image data, and then inputs the generated image data to the control unit 200 via the scanner I/F 207.

A network I/F 208 connects the control unit 200 (i.e., the image forming apparatus 101) to the LAN 100. The network I/F 208 transmits image data or information to an external apparatus on the LAN 100 and receives various pieces of information from an external apparatus on the LAN 100.

Figure 3:
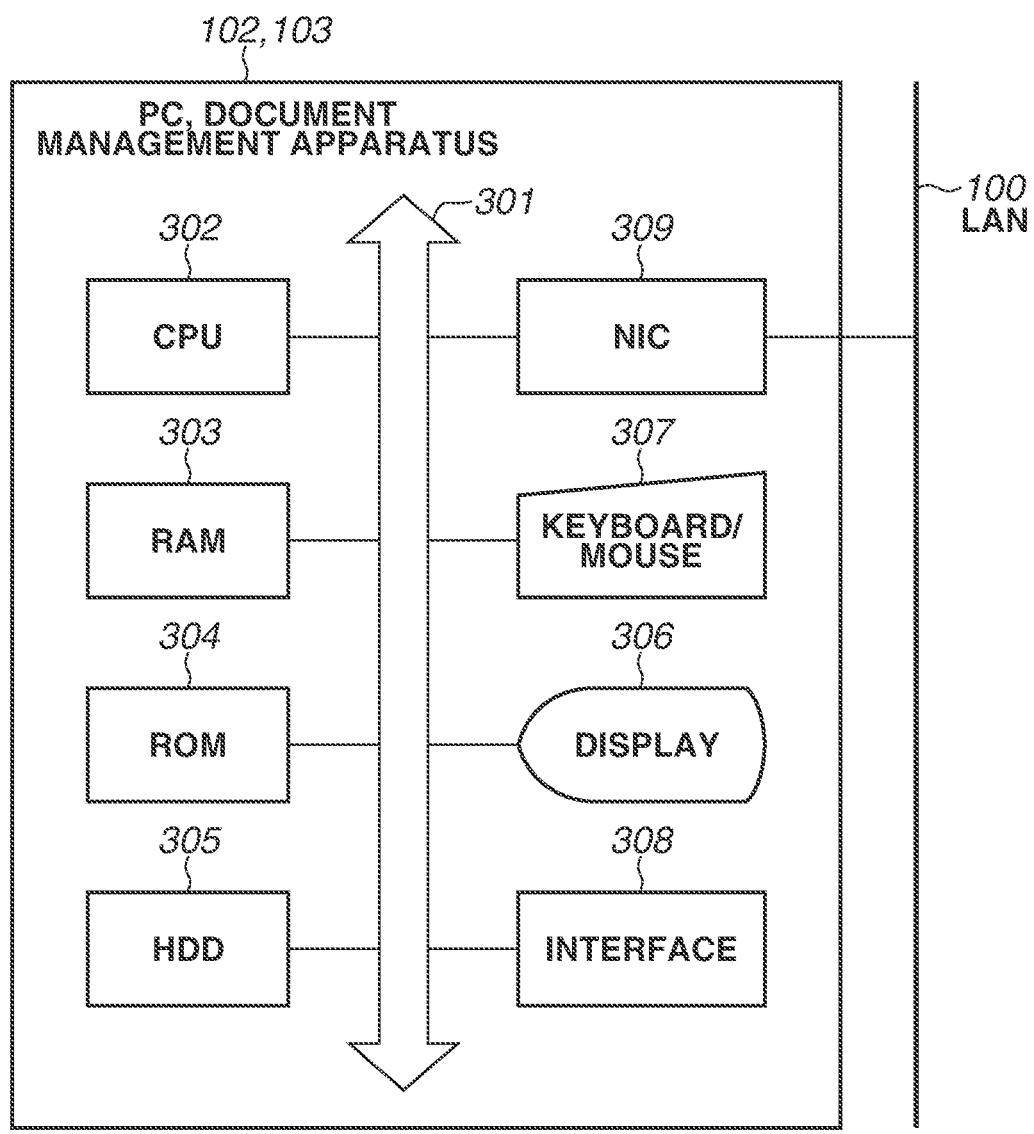
FIG. 3 is a diagram illustrating a hardware configuration of each of a personal computer (PC) and a document management apparatus.

FIG. 3 is a block diagram illustrating a hardware configuration of each of the PC 102 and the document management apparatus 103. A CPU 302 controls the entire PC 102 or document management apparatus 103. The CPU 302 executes, for example, an application program and an operating system (OS) stored in an HDD 305 and performs control to temporarily store, for example, information and files required for execution of the program in a RAM 303. A ROM 304, which is a storage unit, stores therein various pieces of data, such as a basic input-output (I/O) program. The RAM 303, which is a temporary storage unit, serves as, for example, a main memory and a work area for the CPU 302. The HDD 305, which is an external storage unit, serves as a large-capacity memory and stores, for example, application programs, such as an office application and a web browser, an OS, and relevant programs.

A display 306, which is a display unit, displays, for example, a command input via a keyboard/mouse 307, which is an instruction input unit. An interface 308, which is an external apparatus interface (I/F), is used to connect to a printer, a Universal Serial Bus (USB) device, or a peripheral device. A system bus 301 is used for data to flow between the respective units of the PC 102 or the document management apparatus 103. A network interface card (NIC) 309 performs exchange of data with an external apparatus via the LAN 100.

Furthermore, the configuration of such an information processing apparatus is merely an example, and is not limited to the configuration examples illustrated in FIG. 2 and FIG. 3. For example, the storage location of data or programs can be changed between, for example, the ROM 304, the RAM 303, and the HDD 305 depending on characteristics thereof. Unless otherwise specifically described in the present exemplary embodiment, respective processing operations are assumed to be implemented by the CPU 302 loading programs stored in, for example, the ROM 304 onto, for example, the RAM 303 and executing the programs.

Figure 4:
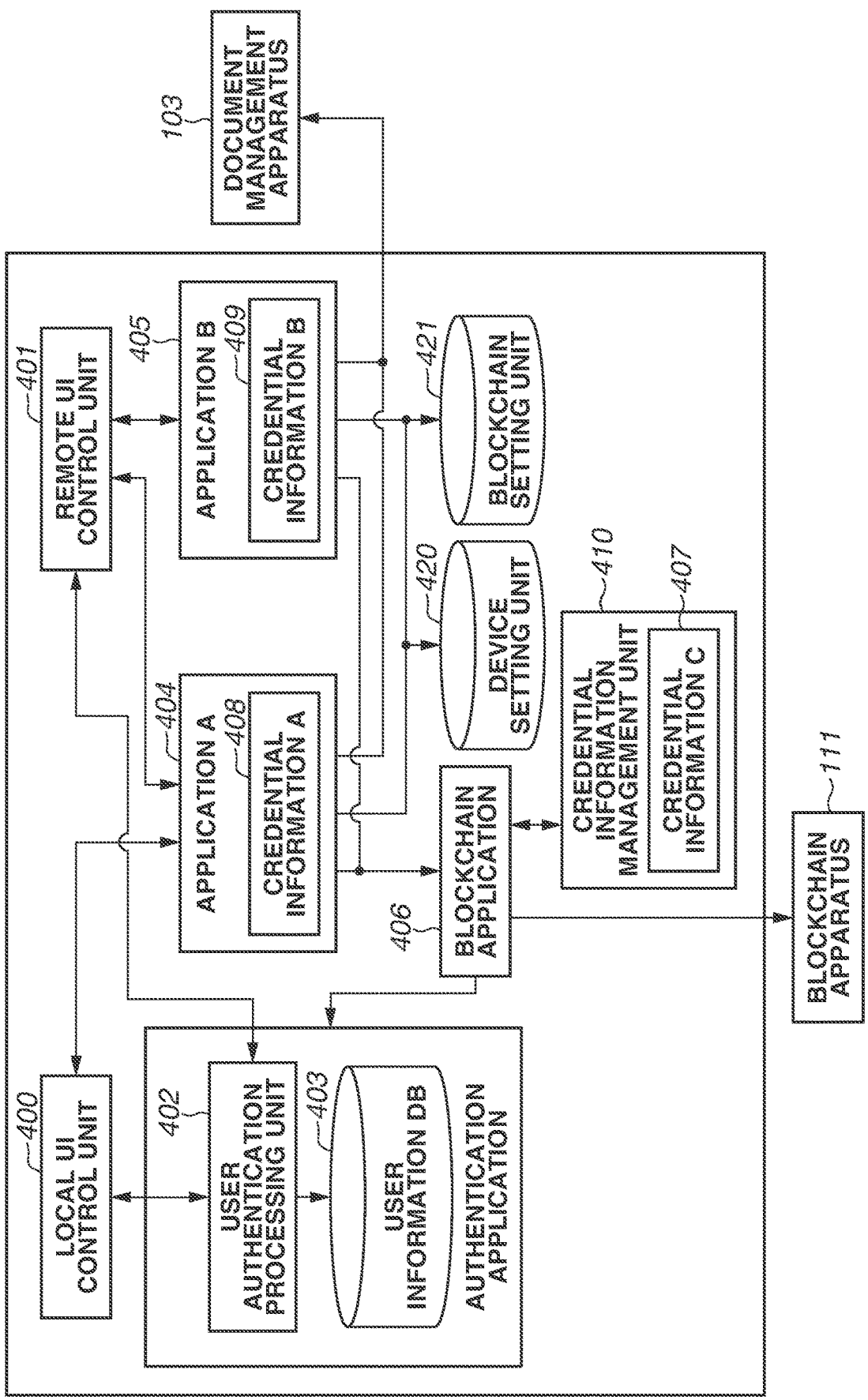
FIG. 4 is a diagram illustrating a software configuration of the image forming apparatus.
Figure 9A:
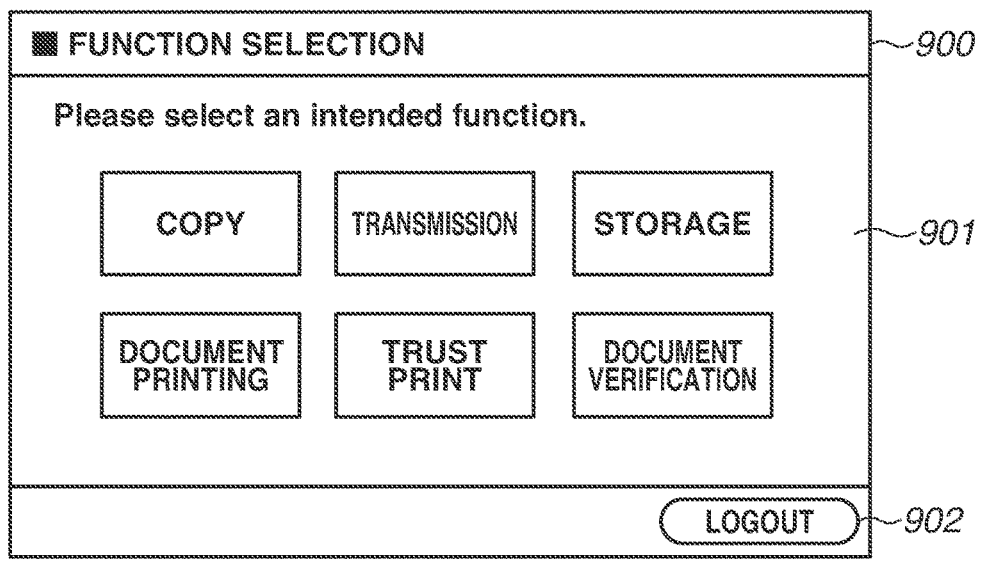
FIGS. 9A and 9B are diagrams illustrating examples of function selection screens.

FIG. 4 is a block diagram illustrating a software configuration related to the present exemplary embodiment in the image forming apparatus 101. Unless otherwise described, each processing unit is a software function which is implemented by the CPU 201 executing a control program stored in the ROM 202. A local user interface (UI) control unit 400 provides the function of controlling the operation unit 209 via the operation unit I/F 205. The local UI control unit 400 communicates the content of an operation performed by the user via the operation unit 209 to a user authentication processing unit 402 or an application A 404. The local UI control unit 400 displays a function selection screen 900 on the operation unit 209. FIG. 9A illustrates an example of the function selection screen 900. The local UI control unit 400 performs control to display a screen on the operation unit 209 upon receiving a screen display request from the user authentication processing unit 402 or the application A 404. The user authentication processing unit 402 or the application A 404 displays a screen on the operation unit 209 via the local UI control unit 400.

Figure 9B:
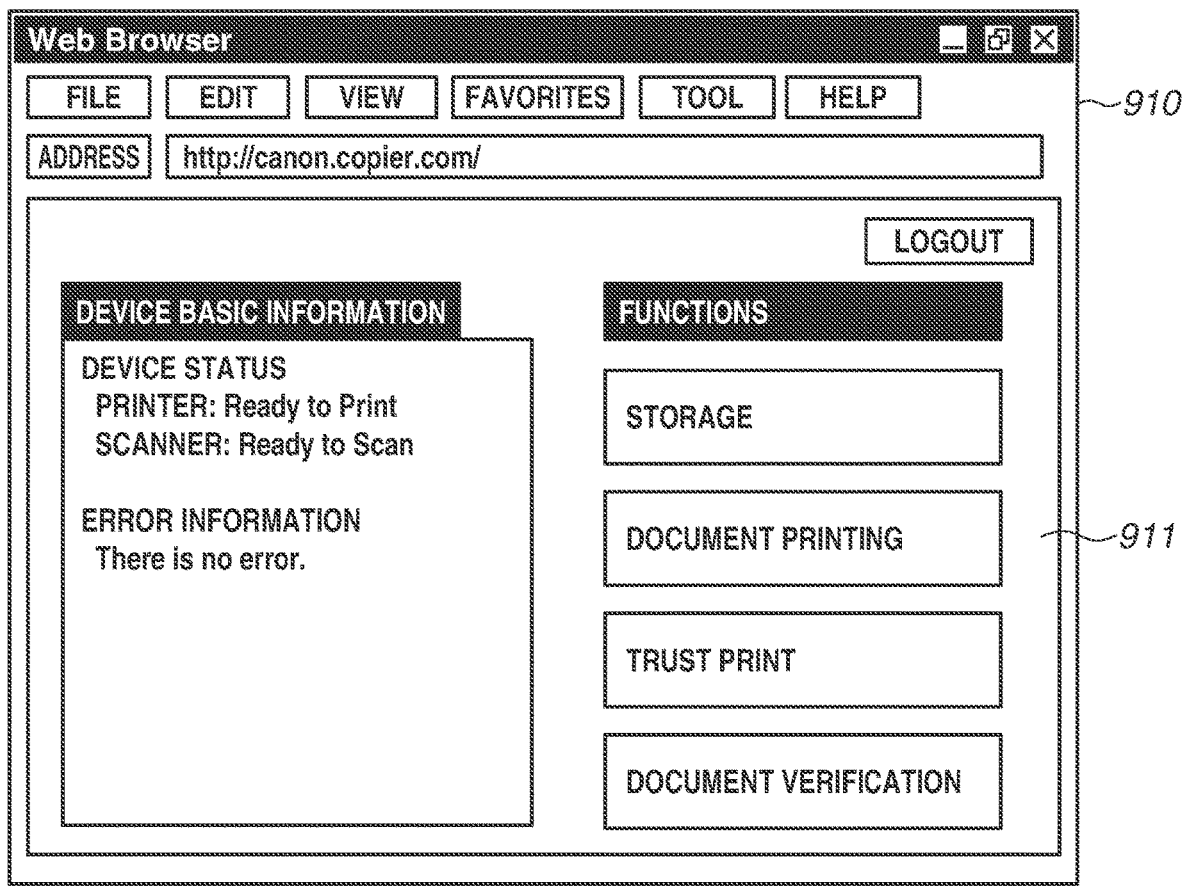

A remote UI control unit 401 provides a web page to a web browser on the PC 102 via the network I/F 208. The remote UI control unit 401 communicates the content of an operation performed by the user on the web browser to the user authentication processing unit 402, the application A 404, or an application B 405. The remote UI control unit 401 displays a function selection screen 910 on a web browser on the PC 102. FIG. 9B illustrates an example of the function selection screen 910. The remote UI control unit 401 performs control to display a web page on the web browser upon receiving a request from the user authentication processing unit 402, the application A 404, or the application B 405. The user authentication processing unit 402, the application A 404, or the application B 405 causes the web browser to display a web page via the remote UI control unit 401.

Figure 7A:
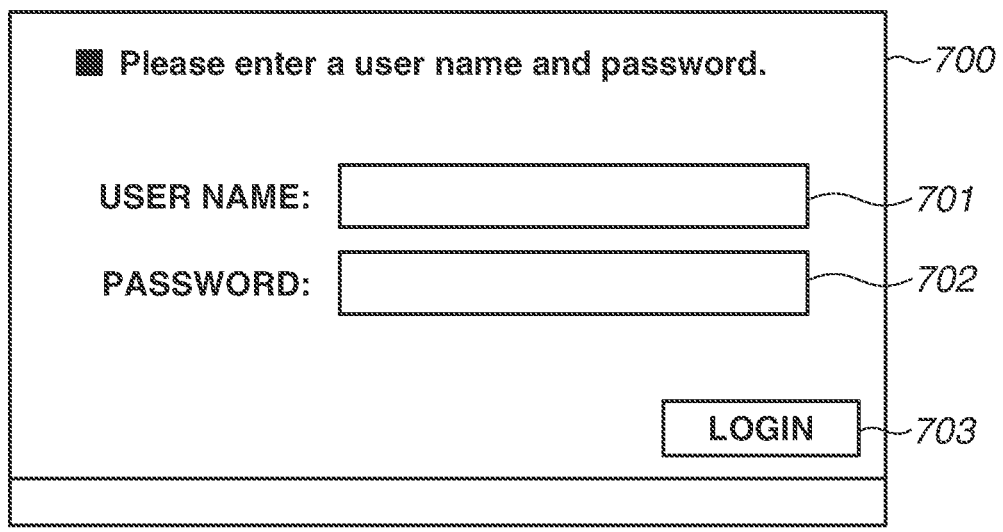
FIGS. 7A and 7B are diagrams illustrating examples of authentication screens.

The user authentication processing unit 402 provides the function of authenticating a user who uses the image forming apparatus 101. Therefore, the user authentication processing unit 402 displays an authentication screen 700, an example of which is illustrated in FIG. 7A, on the operation unit 209. The user authentication processing unit 402 performs user authentication by receiving, via the authentication screen 700, authentication information including a user name and a password input by the user and then comparing the received authentication information with user information stored in a user information database (DB) 403.

The user information DB 403 provides the function of storing user information which is information about users who use the image forming apparatus 101. The user information DB 403 is created in the HDD 204, and pieces of information constituting the user information DB 403 are stored in the HDD 204. Examples of pieces of information which are stored in the user information DB 403 are shown in Table 1.

TABLE 1

User Information Table

| User name | Password | Role |
|---|---|---|
| UserA | **** | Administrator |
| UserB | **** | General User |
| Guest | — | Guest User |

The user information table shown in Table 1 is configured with columns "user name", "password", and "role", and the authentication information and the role are associated with each other. The column "user name" indicates a name for uniquely identifying a user. The column "password" indicates a password which is used for user authentication, and is allowed to be set to an optional value for each user. The column "role" indicates a use authority for the image forming apparatus 101 conferred to each user of the image forming apparatus 101, and, in the present exemplary embodiment, includes three roles, i.e., "administrator", "general user", and "guest user".

The role "administrator" is a role allocated to an administrator user of the image forming apparatus 101, and the role "general user" is a role allocated to a general user who uses the image forming apparatus 101. The role "guest user" is a role allocated to a user with respect to whom functions allowed to be used are intended to be restricted, and is a role allocated in a case where the user uses functions without registering authentication information, such as a user name and a password, with the user information DB 403.

The application A 404 provides a function of converting a scanned document into an electronic document and supplying information about the document to the blockchain apparatus 111 via a blockchain application 406 and registering the document with the document management apparatus 103. The application A 404 provides a function of receiving a registered document and printing the document via the printer I/F 206. Furthermore, while, in the present exemplary embodiment, a document is taken as an example of a printed product, a type of printed product other than documents can be similarly treated. The application A 404 performs transmission of scanned data to an external apparatus by controlling the scanner 211 via the scanner I/F 207 and transmitting data to the LAN 100 via the network I/F 208. The application A 404 provides screen information to the local UI control unit 400 and the remote UI control unit 401.

Figure 12A:
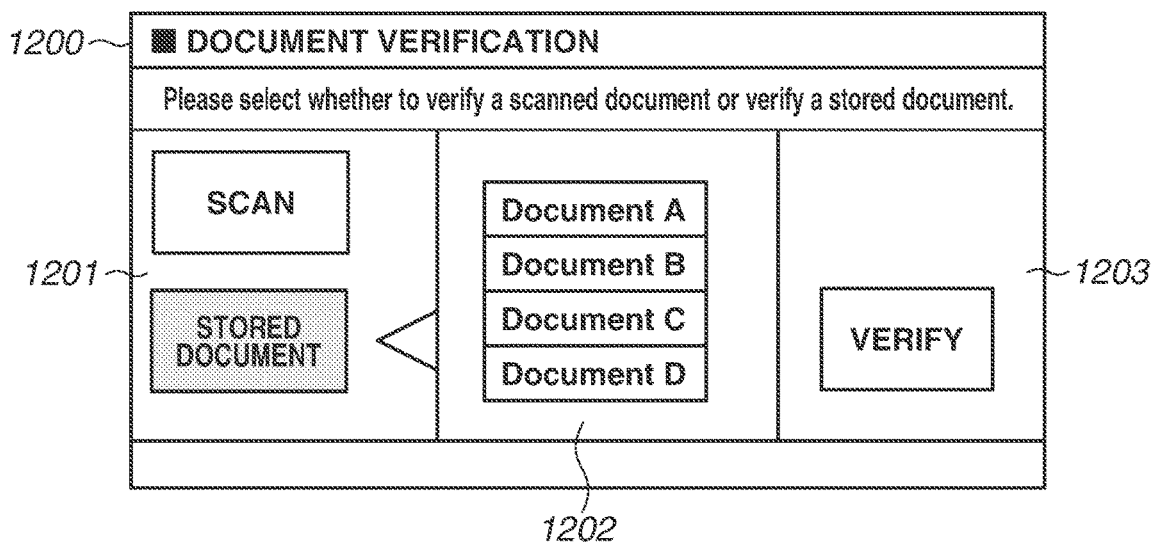
FIGS. 12A and 12B are diagrams illustrating examples of document verification screens for the application A.

The application A 404 receives an input to a screen displayed on the operation unit 209 via the local UI control unit 400, and performs processing according to the received input. The application A 404 displays a printing screen 1000 or a verification screen 1200 on the operation unit 209. An example of the printing screen 1000 is illustrated in each of FIGS. 10A1, 10A2, and 10A3, and an example of the verification screen 1200 is illustrated in FIG. 12A.

Figure 12B:
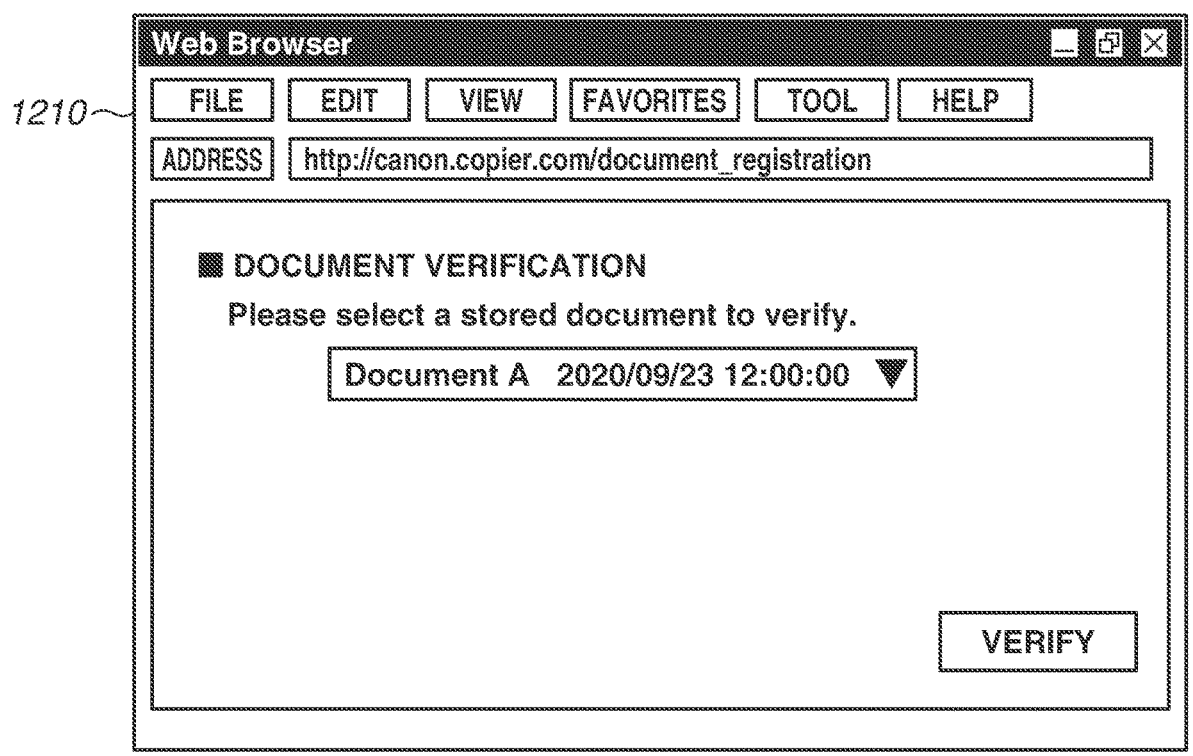

Moreover, the application A 404 receives an input from a web browser on the PC 102 via the remote UI control unit 401, and performs processing according to the received input. The application A 404 displays a printing screen 1050 or a verification screen 1210 on the web browser on the PC 102. An example of the printing screen 1050 is illustrated in FIG. 10B1, and an example of the verification screen 1210 is illustrated in FIG. 12B.

Furthermore, while an example in which the functions of printing and verification of a document are included in a single application is described, such functions can be shared by a plurality of applications. For example, a configuration in which a scan application for performing registration of a document and a printing application for performing printing are separately provided is conceivable.

The application B 405 provides a function of converting a scanned document into an electronic document and supplying information about the document to the blockchain apparatus 111 via the blockchain application 406 and registering the document with the document management apparatus 103, as with the application A 404. The application B 405 provides screen information to the remote UI control unit 401. While the application A 404 treats inputs and outputs from both a local UI and a remote UI via the local UI control unit 400 and the remote UI control unit 401, the application B 405 differently treats inputs and outputs from only a remote UI via the remote UI control unit 401. Furthermore, the application A 404 and the application B 405 do not directly communicate with the blockchain apparatus 111.

Figure 6:
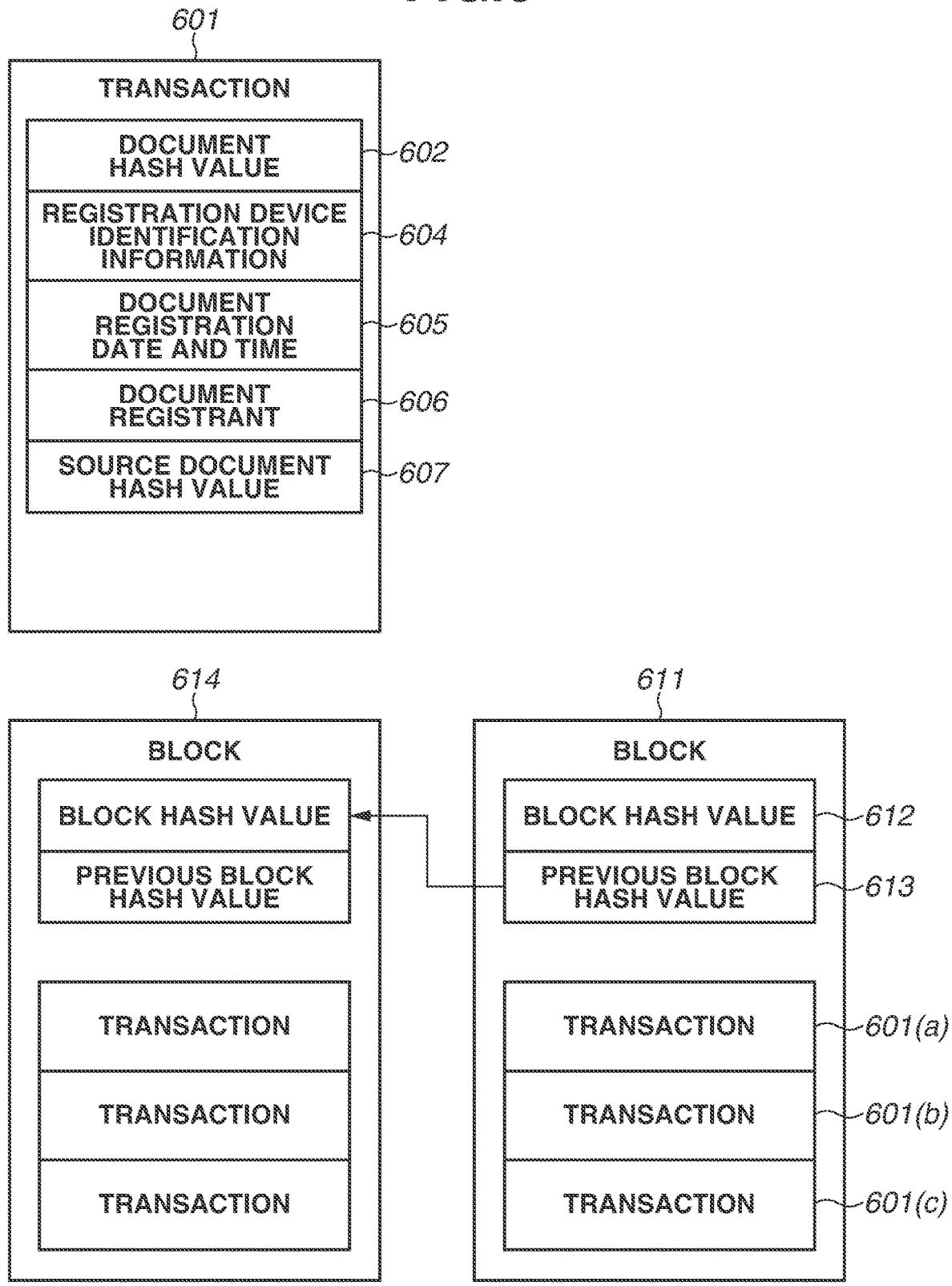
FIG. 6 is a diagram illustrating a data configuration for a blockchain apparatus.

The blockchain application 406 is an application for performing blockchain cooperation, and provides the function of receiving an instruction from the application A 404 or the application B 405 and registering and verifying information about a document with respect to the blockchain apparatus 111. Examples of data structures of a transaction 601 and blocks which the blockchain application 406 registers with the blockchain apparatus 111 are illustrated in FIG. 6, but details thereof are described below.

When receiving an instruction for the blockchain apparatus 111 from an application, the blockchain application 406 also receives credential information from a credential information management unit 410. The blockchain application 406 performs verification of the received credential information, and performs processing with respect to the blockchain apparatus 111 only when the verification is successful.

Credential information A 408 is credential information for insuring that the application A 404 is a legitimate application which is allowed to use the blockchain apparatus 111. The credential information A 408 is issued with respect to an application which has been verified to be performing correct processing, and the application with the credential information incorporated therein is loaded on the image forming apparatus 101. Credential information B 409 is credential information for insuring that the application B 405 is a legitimate application which is allowed to use the blockchain apparatus 111. The credential information B 409 is loaded on the image forming apparatus 101 as with the credential information A 408.

Credential information C 407 is credential information for insuring that the image forming apparatus 101 is a legitimate apparatus which is allowed to use the blockchain apparatus 111. The credential information C 407 can be issued for each apparatus manufacturer by, for example, an organization which administrates the present system. The credential information C 407 can be shipped out in the state of being incorporated in firmware of the image forming apparatus 101, or can be installed on the image forming apparatus 101 after being shipped out. Furthermore, credential information can be a digital certificate or a key pair including a private key and a public key or can be a predetermined data value, so that the substance of credential information has no limitation. Credential information can be a substance which differs for each application.

The credential information management unit 410 provides the function of managing credential information included in the image forming apparatus 101. In the present exemplary embodiment, upon receiving an instruction from the blockchain application 406, the credential information management unit 410 passes on the credential information C 407 to the blockchain application 406. Furthermore, while, in the present exemplary embodiment, the PC 102 cooperates with the blockchain apparatus 111 via the image forming apparatus 101, the credential information management unit 410 is configured not to provide the credential information C 407 to the PC 102. Since, when logging in via a remote UI, the user of the PC 102 is allowed to use the blockchain application 406 based on a role which the image forming apparatus 101 has confirmed, the PC 102 does not need to establish a trust relationship beforehand with the blockchain apparatus 111.

Each of the application A 404 and the application B 405 is able to provide the function of performing printing in a state in which an embedded image corresponding to inquiry information required to inquire of a blockchain service about the presence or absence of registration is embedded in a document. Here, each of the application A 404 and the application B 405 is able to acquire settings relating to embedding an embedded image in a document from a device setting unit 420 and a blockchain setting unit 421. Then, each of the application A 404 and the application B 405 is able to determine the presence or absence of registration of a document with the blockchain service by reading inquiry information from an embedded image embedded in the document at the time of scanning and making an inquiry to the blockchain service.

The inquiry information only needs to be information available for identifying a transaction 601 described below in FIG. 6, and, in the present exemplary embodiment, is set as, for example, a hash value (document hash value) available for uniquely identifying a document. This document hash value refers to a document hash value 602 described below in FIG. 6. Moreover, in the present exemplary embodiment, each of the application A 404 and the application B 405 is able to provide the function of performing printing with the same inquiry information embedded in a plurality of portions of one document (alternatively, one-page document or one-sheet document). In the following description, inquiry information about a document is referred to as a "document hash value", and the number of portions subjected to embedding is referred to as the "number of embedding portions".

The device setting unit 420 provides the function of retaining device settings about the image forming apparatus 101. The device setting unit 420 is created in the HDD 204 and information to be stored in the device setting unit 420 is stored in the HDD 204. An example of information related to the blockchain function stored in the device setting unit 420 is shown in Table 2.

TABLE 2

Device Setting Management Table

| Setting item | Setting value |
|---|---|
| Number of embedding portions (lower limit) | 3 |
| Number of embedding portions (upper limit) | 10 |
| Fixed setting of embedding position | * |
| Condition of embedding position | * |
| User designation of embedding position | Allowable |
| Adjacence or bias of embedding positions | Allowable |

A device setting management table shown in Table 2 is configured with "Number of embedding portions (lower limit)", "Number of embedding portions (upper limit)", "Fixed setting of embedding position", "Condition of embedding position", "User designation of embedding position", and "Adjacence or bias of embedding positions". The "Number of embedding portions (lower limit)" is the required number of embedding portions minimum in embedding inquiry information in a document. Here, the device setting indicates that, in performing printing with inquiry information embedded in a document, printing is to be performed with the inquiry information embedded at three or more portions of the document. Similarly, the "Number of embedding portions (upper limit)" is the maximum number of portions at which inquiry information is allowed to be embedded in a document. Here, the device setting indicates that, in performing printing with inquiry information embedded in a document, printing is able to be performed with the inquiry information embedded at up to ten portions of the document. Other setting examples of the "Number of embedding portions (lower limit)" and the "Number of embedding portions (upper limit)" can include "Min", which designates the smallest number wherever possible, and "Max", which indicates the greatest number wherever possible, respectively.

The "Fixed setting of embedding position" indicates a position designated in embedding inquiry information. In a case where a wild card "*" is designated as the "Fixed setting of embedding position", there is assumed to be no specific limitation about the embedding position. Even with regard to other setting items, in a case where there is no specific designation, such an expression as "*" can be used, or other modes of expression, such as "No designation" and "No setting" can be set. The embedding position is assumed to be designated by setting the position coordinates for embedding or an expression indicating a position, such as "Any one of four corners". On the other hand, the case of not allowing setting of a fixed position is assumed to be set by using an expression, such as "Fixed setting not allowed". The "Condition of embedding position" is a condition of a position at which to embed inquiry information. In the case of performing printing in only a blank area of the document, information indicating a constraint, such as "Only blank area" or "Only blank portion", is set. On the other hand, in the case of performing a setting to overwrite document data, information indicating a constraint, such as "Overwriting allowed" or "Overwriting print", is set. Here, since "*" is set as the setting value, it is indicated that the device setting does not have any constraint condition of the embedding position.

Furthermore, while an example in which "*" is set in the device setting has been described, "*" may be set in other setting management described below and, as a result of consideration of all of the settings, the final setting may become "*" and, thus, the embedding setting may not be finally determined, so that a configuration in which "*" is not employed in the device setting is conceivable. Thus, some setting value would be entered for "*" in Table 2. Alternatively, in preparation for a case where all of the management settings have become "*", taking the form of employing a default value separately is also conceivable.

The "User designation of embedding position" is a setting as to whether to allow the user who has issued an instruction for printing to set the embedding position of inquiry information to an optional position. In a case where the setting value is "Allowable", the user who has issued an instruction for printing is allowed to set or change the embedding position, and, in a case where the setting value is "Unallowable", the user who has issued an instruction for printing is not allowed to set or change the embedding position. Here, since "Allowable" is set, the device setting indicates that the user is allowed to set or change the embedded position. The "Adjacence or bias of embedding positions" is a setting as to whether to allow print processing in a case where embedding positions of inquiry information have become adjacent to each other or in a case where embedding positions of inquiry information have been biased toward a specific position. In a case where the setting value is "Allowable", printing is allowed to be performed, and, in a case where the setting value is "Unallowable", printing is not allowed to be performed.

The determination as to whether the adjacence or bias of embedding positions is occurring can be calculated from the coordinates of embedding positions or information indicating to which areas the embedding positions belong as a result of division into areas. When the coordinates of embedding positions or the areas are biased toward one end, are biased toward nearby horizontal axis coordinates or nearby vertical axis coordinates, or are biased toward a position near a specific coordinate position, it can be determined that there is a bias in the set embedding positions. Moreover, in a case where, when the adjacence or bias has occurred unintentionally, whether to allow printing is left for the user to decide, a setting, such as "Warning display", can be set. An example of a warning screen is described below with reference to an embedding position warning screen 1120 illustrated in FIG. 11C. Furthermore, while, here, setting items concerning the blockchain function in the present exemplary embodiment are taken as an example of the device setting management table, the device setting management table can be configured to also include usual device settings, such as network setting, electric power setting, and sound volume setting. While, the device setting unit 420 is a setting unit concerning the blockchain function included in the image forming apparatus 101, the blockchain apparatus 111 can be configured to include settings similar to those shown in Table 2. Moreover, in a case where the blockchain apparatus 111 includes the settings shown in Table 2, settings of the blockchain apparatus 111 can be configured to be able to be acquired via the blockchain application 406.

The blockchain setting unit 421 retains not only the device settings shown in Table 2 but also a management table which the application A 404 or the application B 405 uses when performing settings corresponding to the situation of the user at the time of printing. The blockchain setting unit 421 is created in the HDD 204, and information to be stored in the blockchain setting unit 421 is stored in the HDD 204. An example of information stored in the blockchain setting unit 421 is shown in Table 3.

TABLE 3

Blockchain Setting Management Table

| State | | Number of embedding portions (lower limit) | Number of embedding portions (upper limit) | Fixed setting of embedding position |
|---|---|---|---|---|
| Security policy | Forcibly set number of embedding portions as plurality | 3 | * | * |
| | Maximize number of embedding portions | * | Max | + |
| | Tighten security of embedding position | * | * | Fixed position not allowed |
| | Not allow overwriting of document data by embedding | * | * | * |
| Role | Administrator | * (Allow overwriting of document level setting) | * (Allow overwriting of document level setting) | * (Allow overwriting of document level setting) |
| | General User | 5 | Max | * |
| | Guest User | Min (setting disabled) | Min (setting disabled) | Any one of four corners |
| Document level | Document importance (high) | 10 | Max | * |
| | Document importance (medium) | 5 | 10 | * |
| | Document importance (low) | 3 | 5 | Any one of four corners |
| Department | Management department | Same as "Document importance (high)" | | |
| | Other departments | Same as "Document importance (low)" | | |
| UC · WF | Trust print | Same as "Document importance (medium)" | | |
| | Blackening printing (official document printing) | Same as "Document importance (high)" | | |
| | Print (normal) | * | * | * |

Blockchain Setting Management Table

| | Condition of embedding position (only blank area or overwriting | User designation of embedding | Adjacence or bias of embedding |

TABLE 3-continued

| | State | allowed) | position | positions |
|---|---|---|---|---|
| Security policy | Forcibly set number of embedding portions as plurality | * | * | * |
| | Maximize number of embedding portions | * | * | + |
| | Tighten security of embedding position | * | Unallowable | Warning display |
| | Not allow overwriting of document data by embedding | Only blank area | * | * |
| Role | Administrator | * (Allow overwriting of document level setting) | Allowable | Warning display |
| | General User | * | Allowable | Warning display |
| | Guest User | * | Unallowable | * |
| Document level | Document importance (high) | Only blank area | Unallowable | * |
| | Document importance (medium) | * | * | * |
| | Document importance (low) | Overwriting allowed | Allowable | * |
| Department | Management department | Same as "Document importance (high)" | | |
| | Other departments | Same as "Document importance (low)" | | |
| UC·WF | Trust print | Same as "Document importance (medium)" | | |
| | Blackening printing (official document printing) | Same as "Document importance (high)" | | |
| | Print (normal) | * | * | * |

The blockchain setting management table of Table 3 shows setting values of the respective setting items corresponding to states obtained at the time of printing. The setting items "Number of embedding portions (lower limit)", "Number of embedding portions (upper limit)", "Fixed setting of embedding position", "Condition of embedding position", "User designation of embedding position", and "Adjacence or bias of embedding positions" are the same setting items as those shown in Table 2. Here, "Security policy", "Role", "Document level", "Department", and "UC·WF" are shown as examples of items indicating the states obtained at the time of printing.

The "Security policy" indicates states of an operation rule for information security measures of a user organization, and includes items and setting values which are to be set in conformity with states of the security policy. Here, items "Forcibly set number of embedding portions as plurality", "Maximize number of embedding portions", "Tighten security of embedding position", and "Not allow overwriting of document data by embedding" are shown as examples of the items set as "Security policy".

The "Role" indicates role states of the user who has issued an instruction for printing, and includes items and setting values which are to be set in conformity with states of the role. Here, a designation "Allow overwriting of document level setting" is set as a setting value for Administrator. This indicates that a user serving as Administrator is able to overwrite a setting conforming to the state of document level immediately described below. On the other hand, a designation "(setting disabled)", which is a setting value for Guest User, indicates that overwriting is disabled. In this way, in a case where an inferior-to-superior relationship is to be defined between settings corresponding to the states, such a setting as to set priorities can be performed. Moreover, while, here, roles "Administrator", "General User", and "Guest User" are shown as examples, other roles, such as "BC (short for blockchain) role", can also be provided.

The "Document level" indicates states of the importance of a document to be printed, and includes items and setting values which are to be set in conformity with states of the importance of a document. Here, "Document importance (high)", "Document importance (medium)", and "Document importance (low)" are shown as examples of the document levels. In addition to these examples, other document attributes available for designating or categorizing a document, such as the secret level of a document, a document name, the type of document, the number of pages of a document, and the disclosure range of a document, can be provided.

The "Department" includes items and setting values which are to be set in conformity with a department to which a user who has issued an instruction for printing belongs. While, here, "Management department" and "Other departments" are shown as examples of the department, another piece of department information or another piece of user attribute information other than "Department" can be designated. Moreover, while, here, setting values, such as "Same as "Document importance (high)"" and "Same as "Document importance (low)"", are set, settings associated with other states in this way can be provided.

The "UC·WF" indicates attributes of use cases and workflows in printing a document, and includes items and setting values which are to be set in conformity with states of the UC and WF. For example, the states of the UC and WF can be expressed as units of functions which the application A 404 provides, and, here, functions such as "Trust print", "Blackening printing (official document printing)", and "Print (normal)" are shown. Other examples include information related to a flow performed at the time of printing, such as an application name and a workflow name. While, in Table 3, respective setting items corresponding to various states taken at the time of printing are shown, other states other than the illustrated examples can be configured to be able to be designated. Moreover, while, here, the management table of Table 2 and the management table of Table 3 are separately shown as examples, a configuration in which both tables are integrated into one management table for device settings or a configuration in which both tables are integrated into one management table for blockchain settings can be employed.

Figure 5:
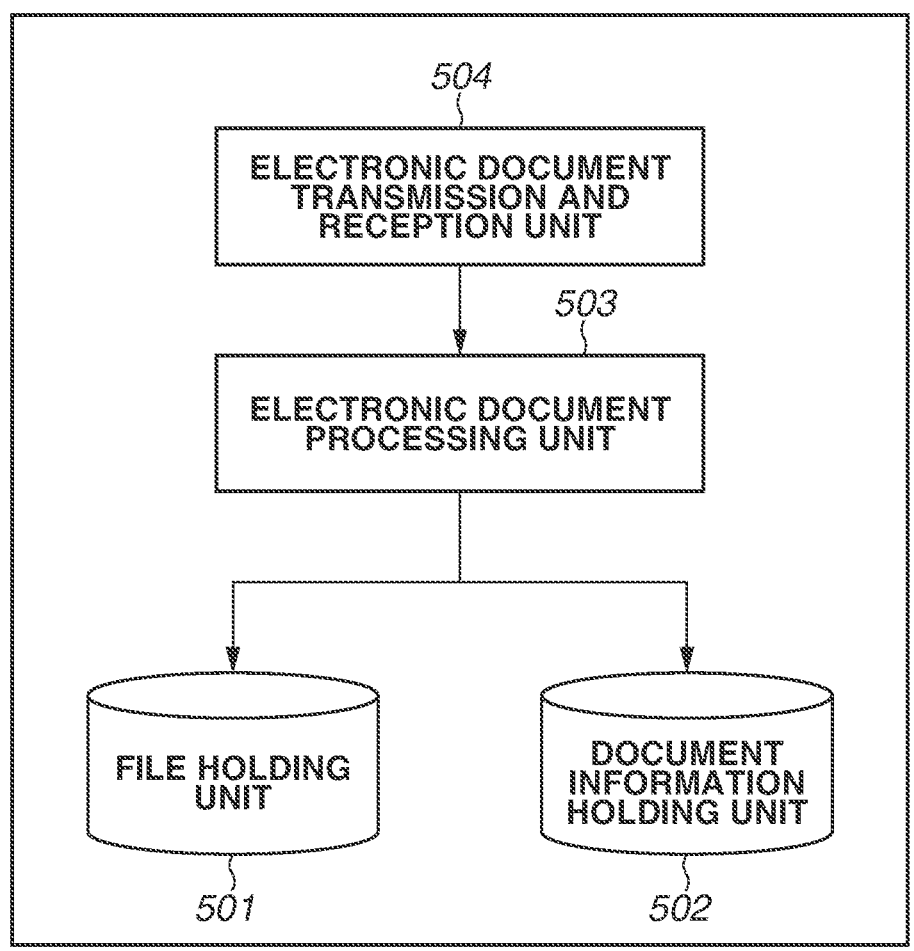
FIG. 5 is a diagram illustrating a software configuration of the document management apparatus.

FIG. 5 is a block diagram illustrating a software configuration related to the present exemplary embodiment in the document management apparatus 103. Electronic documents which the document management apparatus 103 manages include document files, which are stored in a file holding unit 501, and pieces of information indicating respective documents, which are stored in a document information holding unit 502. Data to be stored in the document information holding unit 502 is information set forth in a document information table shown in Table 4.

TABLE 4

Document Information Table

| ID | Document name | Registration date and time | File path |
|---|---|---|---|
| 1 | Document A | 2020 Sep. 23 12:00:00 | D:\Document\document0001.pdf |
| 2 | Document B | 2020 Sep. 24 13:00:00 | D:\Document\document0002.pdf |
| 3 | Document C | 2020 Sep. 25 12:30:00 | D:\Document\document0003.pdf |

The document information table shown in Table 4 is configured with columns "ID", "document name", "registration date and time", and "file path". The column "ID" indicates identification information for uniquely managing an electronic document. The column "document name" indicates a name which is allocated for the user to discriminate an electronic document. The document name can overlap between a plurality of electronic documents. The column "registration date and time" indicates a date and time at which an electronic document was stored in the document management apparatus 103. The column "file path" indicates a location at which a document file stored in the file holding unit 501 is stored. In the present exemplary embodiment, the file path is expressed as a path on a file system, but does not need to be a path as long as it is information uniquely representing a storage location.

While these columns are configured with minimum items required for describing the present exemplary embodiment, for example, information for classifying documents can be additionally stored. An electronic document processing unit 503 has the function of accessing the file holding unit 501 and the document information holding unit 502 and controlling processing operations, such as registration and acquisition of an electronic document and acquisition of a list. These processing operations to be performed by the electronic document processing unit 503 can be performed by being started up by an electronic document transmission and reception unit 504 having received a request for input-output processing about an electronic document from the outside of the document management apparatus 103, such as the image forming apparatus 101 or the PC 102.

FIG. 6 is a block diagram illustrating data structures of a transaction 601 and blocks each storing a plurality of such transactions, which are stored in the blockchain apparatus 111. The blockchain apparatus 111 is an apparatus which manages data in a formation called a blockchain. The blockchain treats information in units of transactions, and manages the transactions in units of blocks each containing a plurality of transactions.

Since each block has a defined association with blocks occurring before and after the block, the respective blocks are configured in such a way as to maintain a beaded state. Moreover, the blockchain is managed by a plurality of computers called nodes, and has a decentralized equipment configuration in which all of the nodes manage equal block data. Therefore, since, in the case of tampering with block data, updating has to be performed on a plurality of nodes constituting the blockchain, the blockchain is known as a data management method strong in anti-tampering property. Furthermore, the blockchain apparatus 111 is described as a single apparatus, but is actually an apparatus composed of a plurality of computers as mentioned above, and the blockchain service is provided by the plurality of computers.

In the present exemplary embodiment, during processing of an electronic document by the image forming apparatus 101, a transaction representing the electronic document is transmitted to the blockchain apparatus 111 and is then subjected to block management, so that a correct state of the electronic document is held. This enables confirming that a printed product has surely been present at a point in time and, moreover, checking whether no tampering has been performed on an electronic document stored in the document management apparatus 103. While, here, a document hash value is used as an example of information for identifying each transaction, identification information that is based on another piece of information, such as an identifier (ID) with a serial number assigned thereto or a time stamp, can be used.

A transaction 601, which represents processing for registration and outputting of an electronic document with the document management apparatus 103, includes the following five pieces of information. A document hash value 602 is a hash value calculated to uniquely represent a target document. A document hash value of a print document, which is a target document, is able to be calculated based on, for example, credential information C 407 about the image forming apparatus 101 and a time stamp obtained at the time of printing. Moreover, the target document can include, in addition to a print document, an electronic document. In the case of an electronic document, the document hash value 602 is a value calculated from the entire electronic document, so that a value to be calculated changes according to a change being made to the electronic document itself. However, a method for calculation other than the above-mentioned method can be employed without being limited.

Registration device identification information 604 is information for identifying an image forming apparatus 101 which has performed document registration, and, in the present exemplary embodiment, stores a hash value of the credential information C 407. A document registration date and time 605 is information representing a point of time at which a document was registered, and, in the present exemplary embodiment, stores a value of the registration date and time shown in Table 4.

A document registrant 606 is information representing a user who has performed document registration, and, in the present exemplary embodiment, stores a hash value of the user name of a user who has logged in to the image forming apparatus 101. Here, since information about, for example, a user name which is previously registered to use the image forming apparatus 101 is able to be directly used as information to be registered with the blockchain apparatus 111, an administrative work load on the administrator of the system can be reduced. A source document hash value 607 is information representing an association between documents. The source document hash value 607 is used, in a case where, for example, printing has been performed based on an electronic document stored in the document management apparatus 103 or a case where, for example, electronic data save has been performed based on a printed product.

Next, a structure of a block which holds the transaction 601 is described with reference to a block 611. The block 611 is obtained by schematizing a general blockchain structure. The block 611 holds a plurality of transactions 601(a) to 601(c) and a block hash value 612 calculated from these transactions 601.

While, in the present exemplary embodiment, the number of transactions 601 included in a block is set to three, the number of transactions is not limited. Moreover, the block 611 further holds a previous block hash value 613. In the present exemplary embodiment, a block hash value of a block 614 is stored in the previous block hash value 613, thus indicating that the respective blocks have an association with each other. While, in the present exemplary embodiment, a previous block hash value is configured to be stored in each block, a configuration in which a subsequent block hash value is managed or both a previous block hash value and a subsequent block hash value are managed can be employed.

Figure 7B:
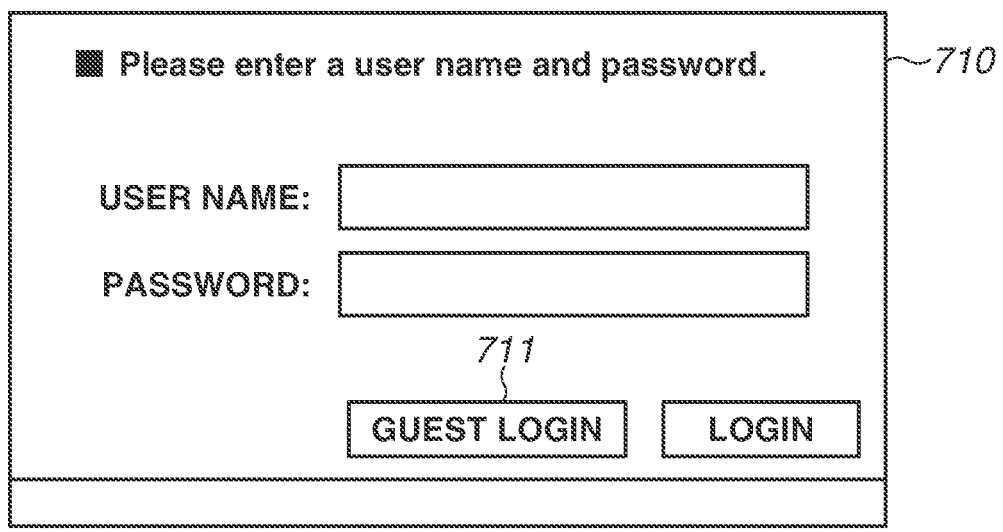

FIGS. 7A and 7B are diagrams illustrating examples of authentication screens. The authentication screen 700 illustrated in FIG. 7A is a screen used to provide the function of allowing the user to perform user authentication to use a function of the image forming apparatus 101. A user name entry field 701 is a field into which the user of the image forming apparatus 101 enters a user name. A password entry field 702 is a field into which the user of the image forming apparatus 101 enters a password. A login button 703 is a button used to initiate user authentication. When the user presses the login button 703, the user authentication processing unit 402 performs user authentication based on values entered in the user name entry field 701 and the password entry field 702.

The authentication screen (guest login) 710 illustrated in FIG. 7B is an example of an authentication screen in which guest login is provided, and is a screen used to provide the function of allowing the user to perform user authentication to use a function of the image forming apparatus 101. In the following description, only differences from the authentication screen 700 are described. A guest login button 711 is a button used to initiate user authentication as a guest user. When the user presses the guest login button 711, the user authentication processing unit 402 permits login without performing authentication using a user name and a password. The user, who has logged in by pressing the guest login button 711, is set to have a user name of "Guest" and a role of "Guest User". Furthermore, in the present exemplary embodiment, although details are omitted from description, the user authentication processing unit 402 can be set to switch which of the authentication screen 700 and the authentication screen (guest login) 710 to display.

Figure 8A:
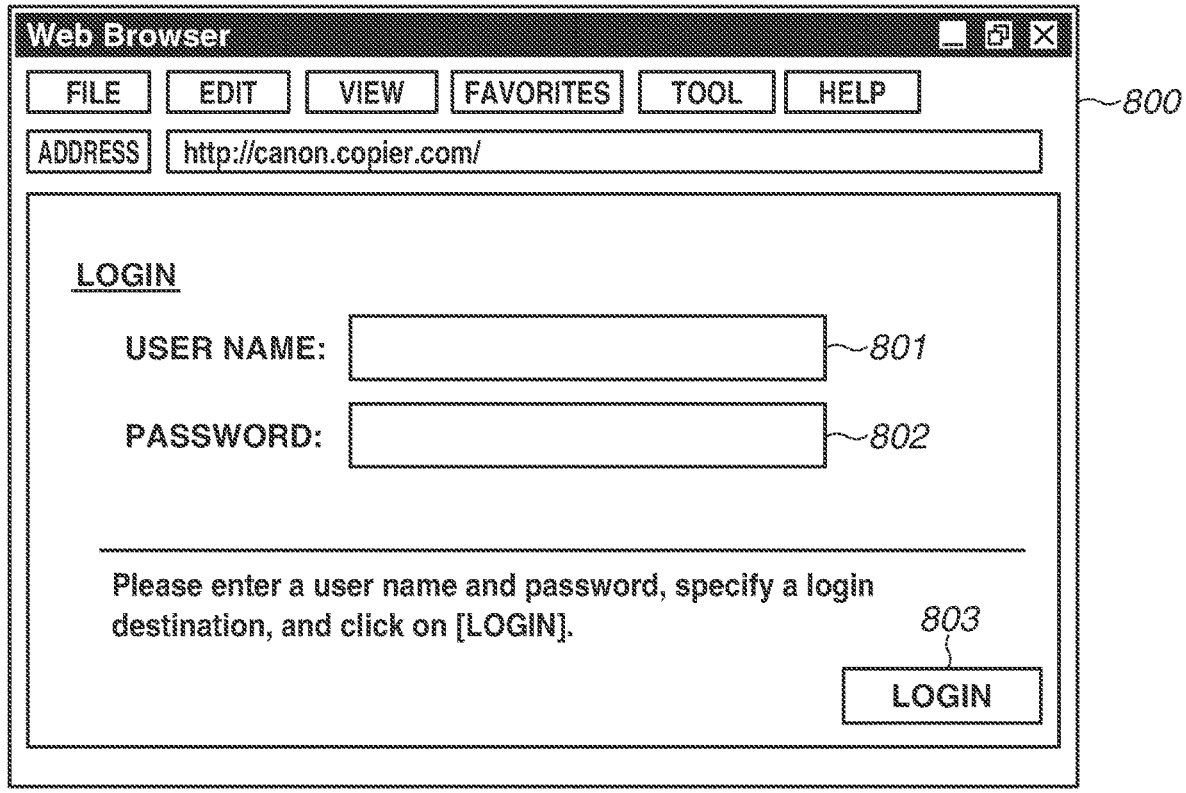
FIGS. 8A and 8B are diagrams illustrating examples of remote authentication screens.
Figure 8B:
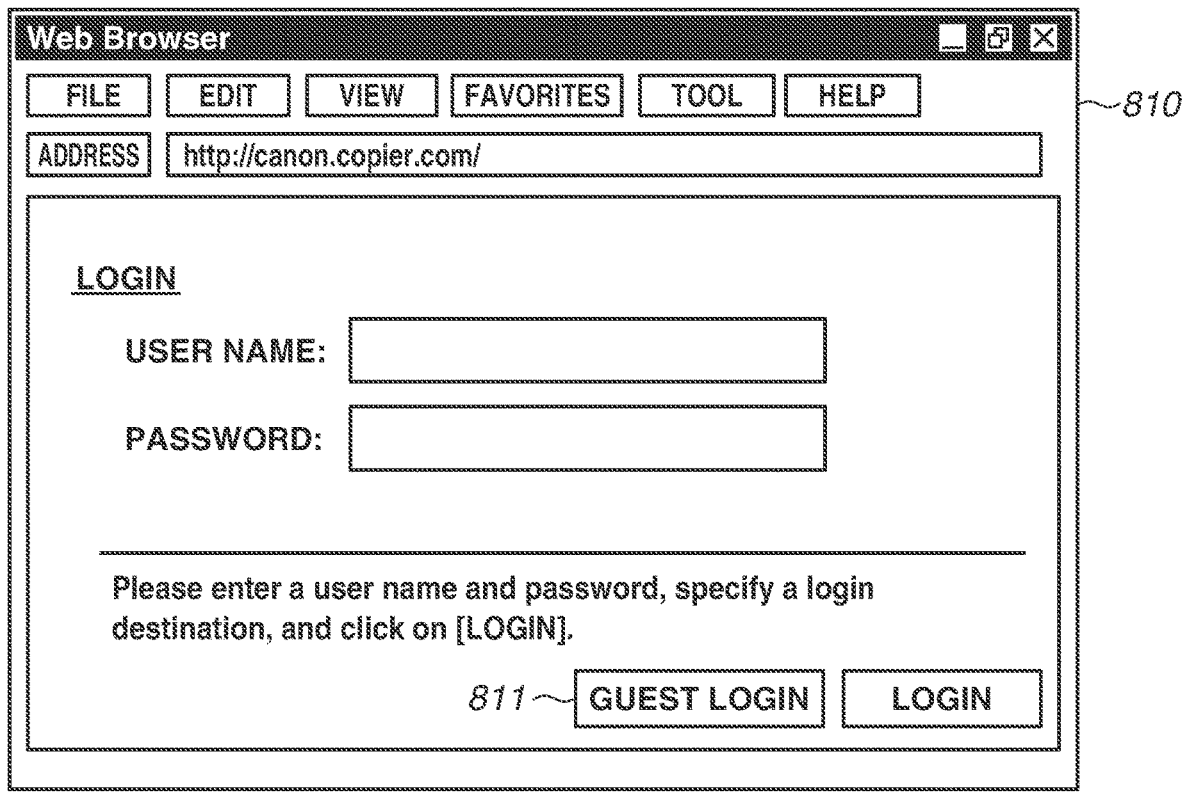

FIGS. 8A and 8B are diagrams illustrating examples of remote authentication screens. The remote authentication screen 800 illustrated in FIG. 8A is a screen used to perform user authentication for the user to use a function of the image forming apparatus 101 via a web browser on the PC 102. A user name entry field 801 is a field into which the user of the image forming apparatus 101 enters a user name. A password entry field 802 is a field into which the user of the image forming apparatus 101 enters a password. A login button 803 is a button used to initiate user authentication. When the user presses the login button 803, the user authentication processing unit 402 performs user authentication based on values entered in the user name entry field 801 and the password entry field 802.

The remote authentication screen (guest login) 810 illustrated in FIG. 8B is a screen used to provide the function of allowing the user to perform user authentication to use a function of the image forming apparatus 101. In the following description, only differences from the remote authentication screen 800 are described.

A guest login button 811 is a button used to initiate user authentication as a guest user. When the user presses the guest login button 811, the user authentication processing unit 402 permits login without performing authentication using a user name and a password. The user, who has logged in by pressing the guest login button 811, is set to have a user name of "Guest" and a role of "Guest User". Furthermore, in the present exemplary embodiment, although details are omitted from description, the user authentication processing unit 402 can be set to switch which of the remote authentication screen 800 and the remote authentication screen (guest login) 810 to display.

FIGS. 9A and 9B are diagrams illustrating examples of function selection screens which the local UI control unit 400 and the remote UI control unit 401 display, respectively. Each of the function selection screens illustrated in FIGS. 9A and 9B indicates a list of functions included in the image forming apparatus 101. The user of the image forming apparatus 101 is able to press a button displayed in each screen to use each function included in the image forming apparatus 101.

The function selection screen 900 illustrated in FIG. 9A is a screen which is displayed on the operation unit 209 by the local UI control unit 400 immediately after login is performed via the authentication screen 700 or the authentication screen (guest login) 710. Function selection buttons 901 are buttons operable to use the respective functions of the image forming apparatus 101.

A copy button is a button used to display a screen operable to use a copy function, a transmission button is a button used to display a screen operable to use the function of transmitting a scanned document to the PC 102, and a storage button is a button used to display a screen operable to use the function of storing a scanned electronic document in the HDD 204. While, in the present exemplary embodiment, screens which are displayed after the respective buttons are pressed are omitted from description, conventional screens can be employed.

When a document printing button is pressed, the printing screen 1000 is displayed. A trust print button is a button used to provide the function of registering all of the documents to be printed with the blockchain service. In this way, a button dedicated to a specific use case or workflow can be prepared. When the trust print button is pressed, the printing screen 1000 is displayed with the blockchain function enabled. When a document verification button is pressed, the verification screen 1200 is displayed.

A logout button 902 is a button used to perform logout processing, which is displayed during login. When the logout button 902 is pressed, logout processing is performed, and, after that, the authentication screen 700 or the authentication screen (guest login) 710 is displayed.

The function selection screen 910 illustrated in FIG. 9B is an example of a screen which is displayed on a web browser on the PC 102 by the remote UI control unit 401 immediately after login is performed via the remote authentication screen 800 or the remote authentication screen (guest login) 810.

Function selection buttons 911 are buttons operable to use the respective functions. A screen which is displayed after a storage button is pressed is omitted from description, as with the function selection screen 900. When a document printing button is pressed, the printing screen 1050 is displayed. When a trust print button is pressed, the printing screen 1050 is displayed with the blockchain function enabled. When a document verification button is pressed, the verification screen 1210 is displayed. Furthermore, the selection of functions is not limited to this configuration, and, for example, a configuration in which the application A 404 is displayed in the function selection screen 900 and functions, such as printing and verification, are allowed to be selected after the application A 404 is selected can be employed.

FIGS. 10A1 to 10A3 illustrate examples of document printing screens which the application A 404 displays. The printing screen 1000 in each of FIGS. 10A1 to 10A3 is a screen used to provide the function of printing a document managed by the document management apparatus 103. A document selection list 1001 is a list used to select a document to be stored or printed, and the application A 404 displays documents managed by the document management apparatus 103 in the document selection list 1001. A print start button 1002 is a button used to start execution of printing of a document selected in the document selection list 1001. A cancel button 1003 is a button used to close the printing screen and return to the function selection button 900. A BC registration selection button 1004 is a button used to cause the user to select whether to register a document to be printed with the blockchain service and embed inquiry information in the document.

In a case where "Do" is selected in the BC registration selection button 1004, a BC function setting screen 1010 is displayed. A print setting selection button 1005 is a button used to cause the user to select a finish setting of a document to be printed, and, here, includes color selection and paper selection as an example. While a method of not displaying the BC registration selection button 1004 depending on a user who logs in or a document to be printed is conceivable, in that case, processing is to be performed in any one of a method of requiring the user to register a document hash value or a method of not registering the document hash value.

The BC function setting screen 1010 is a screen used to provide the function of setting the number of embedding portions or confirming the embedding position. A number-of-embedding-portions setting area 1011 is an entry area used to receive setting of the number of embedding portions from the user. A range of value allowed to be entered in the number-of-embedding-portions setting area 1011 is displayed in an enterable number range 1012. The range of value displayed in the enterable number range 1012 is from the number of embedding portions (lower limit) to the number of embedding portions (upper limit). Moreover, in the number-of-embedding-portions setting area 1011 or the enterable number range 1012, a note indicating that a default value of the number of embedding portions is determined within the range of value, for example, the number of embedding portions (lower limit) is set as a default value, can be displayed. An embedding position preview 1013 displays positions at which to embed inquiry information. In the case of printing a document having a plurality of pages, preview for the respective pages is performed. A back button 1014 is a button used to close the BC function setting screen and return to the printing screen 1000. An OK button 1015 is a button used to start printing. An embedding position setting button 1016 is a button used to display an embedding position setting screen 1020.

The embedding position setting screen 1020 is a screen used to provide the function of performing setting of the embedding position. An embedding position setting area 1021 is an area used to receive the embedding position setting from the user. Positions which the user is allowed to designate can be limited to be displayed. In the case of printing a document having a plurality of pages, selection for the respective pages is able to be performed. A back button 1022 is a button used to close the embedding position setting screen 1020 and display the BC function setting screen 1010. Furthermore, if it is desirable not to inform the user of the embedding position, the embedding position preview 1013 or the embedding position setting button 1016 does not need to be displayed.

In FIGS. 10B1, 10B2, and 10B3, a printing screen 1050 is a screen used to provide the function of printing a document managed by the document management apparatus 103, and is an example of a screen which is displayed in the web browser on the PC 102. A BC function setting screen 1060 is a screen used to provide the function of setting the number of embedding portions or confirming the embedding position, and is an example of a screen which is displayed in the web browser on the PC 102. An embedding position setting screen 1070 is a screen used to provide the function of performing setting of the embedding position, and is an example of a screen which is displayed in the web browser on the PC 102.

Figure 11A:
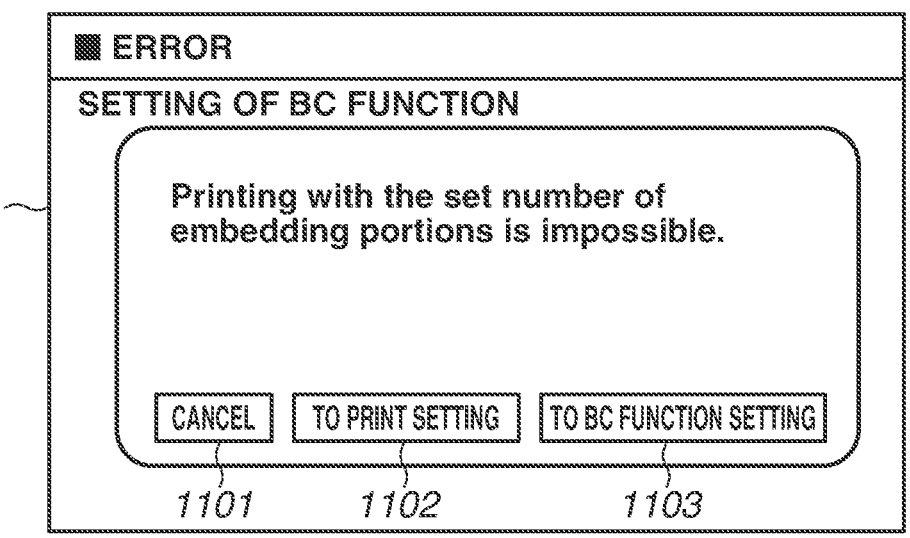
FIGS. 11A, 11B, and 11C are diagrams illustrating examples of error warning screens for the application A.
Figure 11B:
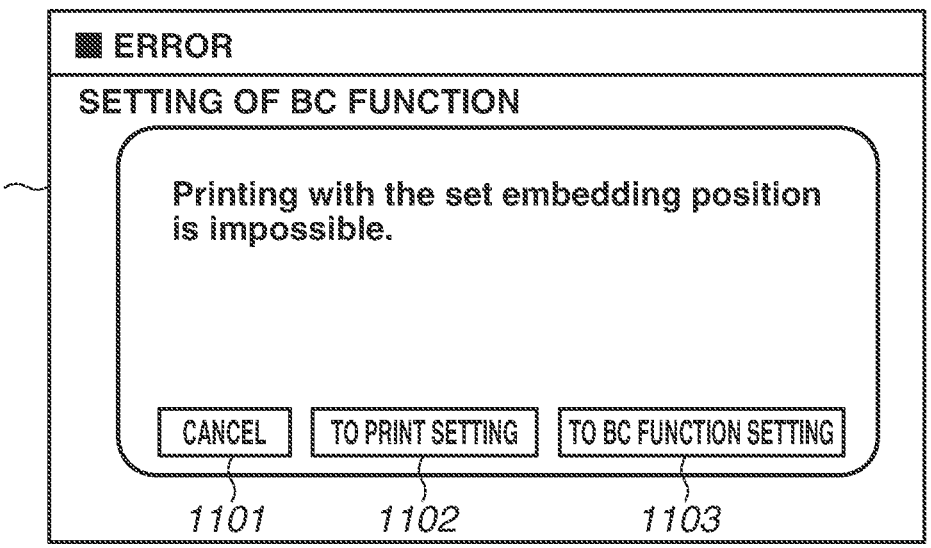
Figure 11C:
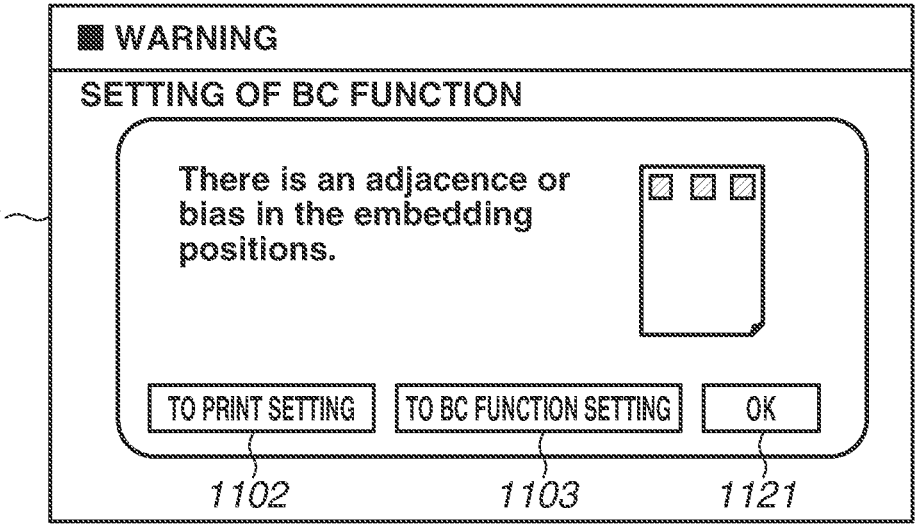

FIGS. 11A, 11B, and 11C illustrate examples of error screens, which are displayed in error processing, and a warning screen, which is displayed in warning processing, which the application A 404 displays. A number-of-embedding-portions error screen 1100 illustrated in FIG. 11A is an error screen which is displayed when the condition of the number of embedding portions is not satisfied. A cancel button 1101 is a button used to cancel print processing and return to the function selection screen 900. A to-print setting button 1102 is a button used to return to the printing screen 1000. A to-BC function setting button 1103 is a button used to return to the BC function setting button 1010. An embedding position error screen 1110 illustrated in FIG. 11B is an error screen which is displayed when the condition of the embedding position is not satisfied. An embedding position warning screen 1120 illustrated in FIG. 11C is a warning screen when there is a bias in the embedding positions. An OK button 1121 is a button used to close the warning screen and proceed with the processing.

FIGS. 12A and 12B are diagrams illustrating examples of screens used to verify a document which the application A 404 displays. The verification screen 1200 illustrated in FIG. 12A is a screen used to provide the function of verifying that a scanned document or a document stored in the image forming apparatus 101 is a right document, with use of the blockchain apparatus 111.

A document selection setting 1201 is a setting used to select a document targeted for verification from a scanned paper document or a document stored in the image forming apparatus 101. A document selection list 1202 is a list used to select a document targeted for verification, and is a list of documents which are currently stored in the HDD 204. A verify button 1203 is a button used to perform scanning of a document in a case where "scan" is selected in the document selection setting 1201 and, after that, perform verification of the document with use of the blockchain apparatus 111. In a case where "stored document" is selected in the document selection setting 1201, the verify button 1203 is used to verify a document selected in the document selection list 1202. The verification screen 1210 illustrated in FIG. 12B is a screen used to provide the function of verifying that a document stored in the HDD 204 is a right document, with use of the blockchain apparatus 111, and is an example of a screen which is displayed in the web browser on the PC 102.

FIG. 13A, FIG. 13B, FIG. 13C, FIG. 13D, FIG. 13E, and FIGS. 13F1 and 13F2 are flowcharts of print processing in which the image forming apparatus 101 performs printing of an electronic document stored in the document management apparatus 103. While, here, a case where the user uses the image forming apparatus 101 via the control unit 200 is described, the user can use the image forming apparatus 101 via the web browser on the PC 102.

Figure 13A:
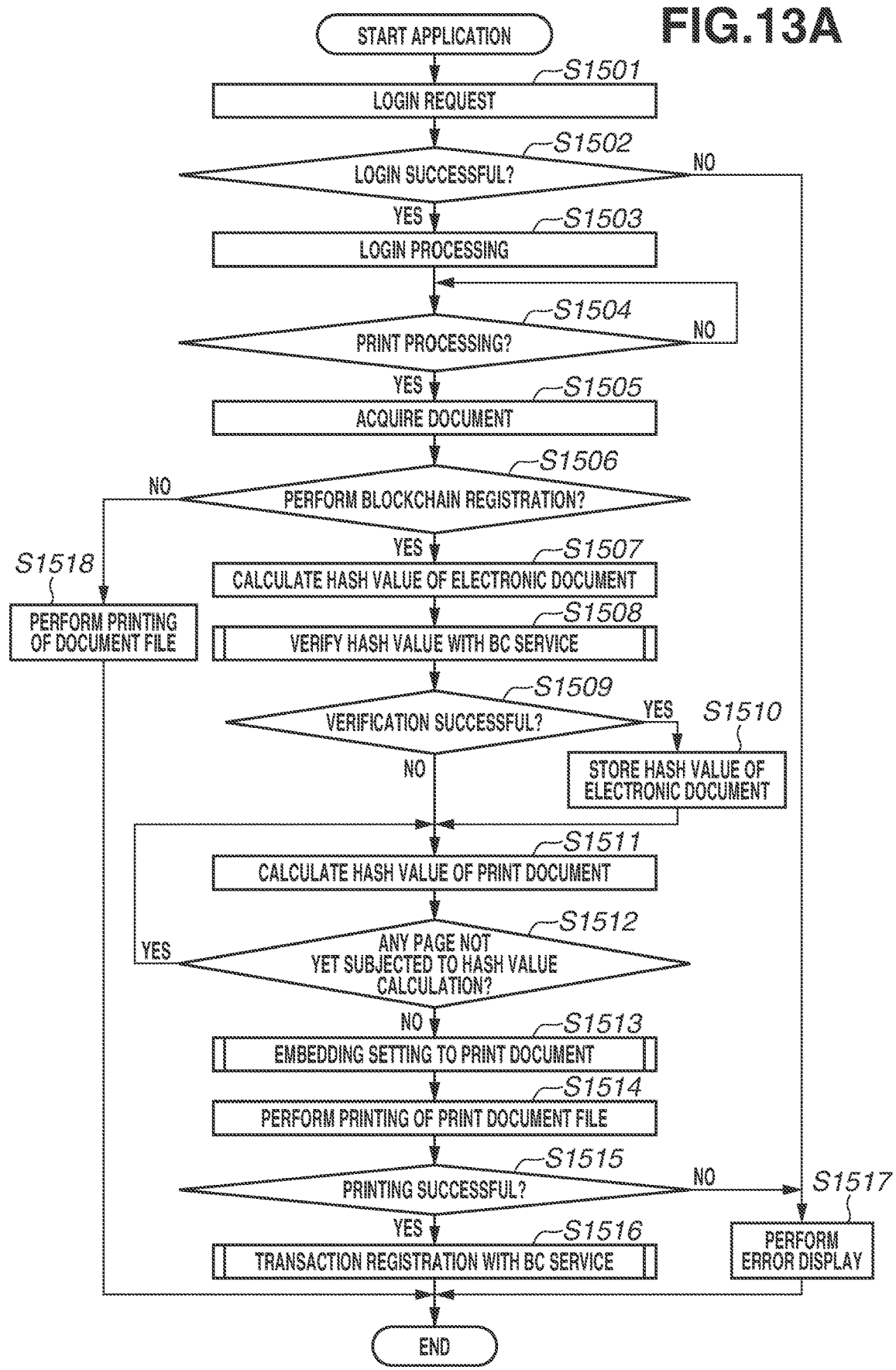
FIG. 13A is flowchart illustrating processing for printing a document by the image forming apparatus.

The flowchart illustrated in FIG. 13A is started in response to the login button 703 being pressed in the authentication screen 700, and, first, the user authentication processing unit 402 is executed by the CPU 201. At the time of starting of the present flowchart, a user name and a password entered by the user of the image forming apparatus 101 via the authentication screen 700 are passed to the user authentication processing unit 402. In S1501, the user authentication processing unit 402 receives the user name and the password as a login request. In S1502, the user authentication processing unit 402 checks whether the received user name and password match a user name and password included in the user information table shown in Table 1, and, if it is determined that the received user name and password match a user name and password included in the user information table (YES in S1502), the user authentication processing unit 402 determines that the user authentication is successful and then advances the processing to S1503. If it is determined that the received user name and password do not match a user name and password included in the user information table (NO in S1502), the user authentication processing unit 402 determines that the user authentication is failed and then advances the processing to S1517.

In S1503, the user authentication processing unit 402 performs login processing to store the user name received in S1501 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document printing button is pressed by the user, and, with respect to the subsequent processing, the application A 404 is executed by the CPU 201. The application A 404, which has taken over the processing, displays the printing screen 1000 on the operation unit 209.

In S1504, the application A 404 displays the printing screen 1000 illustrated in FIG. 10A1 on the operation unit 209 via the operation unit I/F 205 and waits for the print start button 1002 to be pressed, and then, if the print start button 1002 is pressed (YES in S1504), the application A 404 advances the processing to S1505. In S1505, the application A 404 acquires, from the document management apparatus 103, an electronic document selected in the document selection list 1001 of the printing screen 1000. The application A 404 temporarily stores document information about the acquired electronic document in the RAM 203 and temporarily stores a document file of the acquired electronic document in the HDD 204.

In S1506, the application A 404 determines whether "Do" is selected in the BC registration selection button 1004. If it is determined that "Do" is selected (YES in S1506), the application A 404 advances the processing to S1507. If it is determined that "Do" is not selected (NO in S1506), the application A 404 advances the processing to S1518. In S1518, the application A 404 causes the printer 210, via the printer I/F 206 of the image forming apparatus 101, to perform print processing on document data stored in the HDD 204.

In S1507, the application A 404 calculates a hash value from the document data stored in the HDD 204. Then, the application A 404 advances the processing to S1508. While processing until S1507 is processing which the application A 404 performs, processing in S1508 becomes processing which the blockchain application 406 performs. In S1508, the blockchain application 406 verifies whether the hash value calculated by the application A 404 in S1507 is currently blockchain-registered. This verification processing is described below with reference to FIG. 15.

When invoking the blockchain application 406, the application A 404 passes, to the blockchain application 406, document verification as a type of processing, the document hash value calculated or acquired in S1507, and the credential information A 408. Processing since S1509 becomes processing which the application A 404 performs again. In S1509, the application A 404 whether verification of the hash value performed by the blockchain application 406 in S1508 is successful. In a case where the hash value calculated in S1507 is currently registered with the blockchain service, it is determined that verification is successful (YES in S1509), so that the application A 404 advances the processing to S1510. If it is determined that verification is not successful (NO in S1509), the application A 404 advances the processing to S1511. In S1510, the application A 404 stores the hash value calculated in S1507 as a hash value of the source document.

In S1511, the application A 404 calculates a hash value to be set for a print document. The hash value to be calculated here is document information and is treated as the document hash value 602. The application A 404 calculates this hash value using the credential information C 407 about the image forming apparatus 101 and data-and-time information included in the image forming apparatus 101 at the time of processing in S1511. In a case where a print document has a plurality of pages, the application A 404 is also able to calculate a hash value on a page-by-page basis, and, in that case, treats information about a page number of each page as information for use in calculating a hash value. Furthermore, while, in the present exemplary embodiment, a configuration in which the image forming apparatus 101 generates inquiry information, i.e., the document hash value 602, is described as an example, a configuration in which the image forming apparatus 101 requests another information processing apparatus, such as the blockchain apparatus 111 or the document management apparatus 103, to generate inquiry information and then acquires the generated inquiry information can be employed. Alternatively, a configuration in which, while an information processing apparatus, such as the blockchain apparatus 111 or the document management apparatus 103, calculates the document hash value 602, the image forming apparatus 101 first inquires of the blockchain apparatus 111 whether the calculated hash value is registrable and, if the calculated hash value is registrable, uses the calculated hash value can also be employed.

In S1512, the application A 404 determines whether there is a page not yet subjected to hash value calculation, and, if it is determined that there is a page not yet subjected to hash value calculation (YES in S1512), the application A 404 returns the processing to S1511 and, if it is determined that there is no page not yet subjected to hash value calculation (NO in S1512), the application A 404 advances the processing to S1513. Furthermore, while, in the present exemplary embodiment, a configuration in which, in the case of a document having a plurality of pages, different hash values are provided on a page-by-page basis is employed, a configuration in which one hash value is provided on a document-by-document basis or in a plurality of pages can also be employed. In S1513, the application A 404 performs embedding setting processing to a print document. This embedding setting processing is described with reference to FIG. 13B. Furthermore, in the present exemplary embodiment, since document information is calculated on a page-by-page basis and, thus, different hash values are provided for the respective pages, such respective pieces of information are registered with the blockchain service.

In S1514, the application A 404 causes the printer 210 to perform print processing on a document file with the hash value set therein via the printer I/F 206 of the image forming apparatus 101. Then, in S1515, the application A 404 determines whether the print processing has been normally completed. If it is determined that print processing has been normally completed (YES in S1515), the application A 404 advances the processing to S1516, and, if it is determined that print processing has not been normally completed (NO in S1515), the application A 404 advances the processing to S1517. While processing until S1515 is processing which the application A 404 performs, processing in S1516 becomes processing which the blockchain application 406 performs. In S1516, the blockchain application 406 registers information about the print processing with the blockchain apparatus 111. In a case where the print document has a plurality of pages, the blockchain application 406 performs respective registration processing for the number of pages. This registration processing is described below with reference to FIG. 15. Here, values to be designated to the transaction 601 for registration are described.

The hash value of the print document calculated in S1511 is designated as the document hash value 602. A hash value of the credential information C 407 about the image forming apparatus 101 which has performed printing is designated as the registration device identification information 604. The date and time information representing the date and time at which a hash value was calculated in S1511 is designated as the document registration date and time 605. A hash value of the user name of the user who is logged in to the image forming apparatus 101 which has performed printing is designated as the document registrant 606. The document hash value 602 representing the source document stored in S1510 is designated as the source document hash value 607. If the document hash value 602 representing a source document is not currently stored, no designation is performed.

Here, the application A 404 passes the credential information A 408 to the blockchain application 406. The credential information A 408 is used by the blockchain application 406 to verify that a series of processing operations concerning acquisition of an electronic document is being performed by a legitimate application. In S1517, the application A 404 performs error display indicating a case where printing is not permitted in the present flowchart. In this respect, the application A 404 displays an error dialog (not illustrated) on the operation unit 209.

Moreover, while a plurality of embedded images may be included in a printed product, the application A 404 does not need to register pieces of document information corresponding to all of the embedded images. Since all of the pieces of document information serving as a generation source of a plurality of embedded images are the same information, only a single piece of information to be registered with the blockchain service is required. Therefore, in the present exemplary embodiment, document information is assumed to be registered in such a manner that, in registering document information with the blockchain service, pieces of document information are not registered in an overlapping manner.

In this way, it is possible to generate a document hash value capable of uniquely identifying a print document, embed, in the print document, the document hash value as document information serving as inquiry information, and print the print document with the document hash value embedded therein. Then, in a case where printing has been normally completed, it is possible to register, with the blockchain service, the document hash value recorded on the printed document during printing.

Figure 13B:
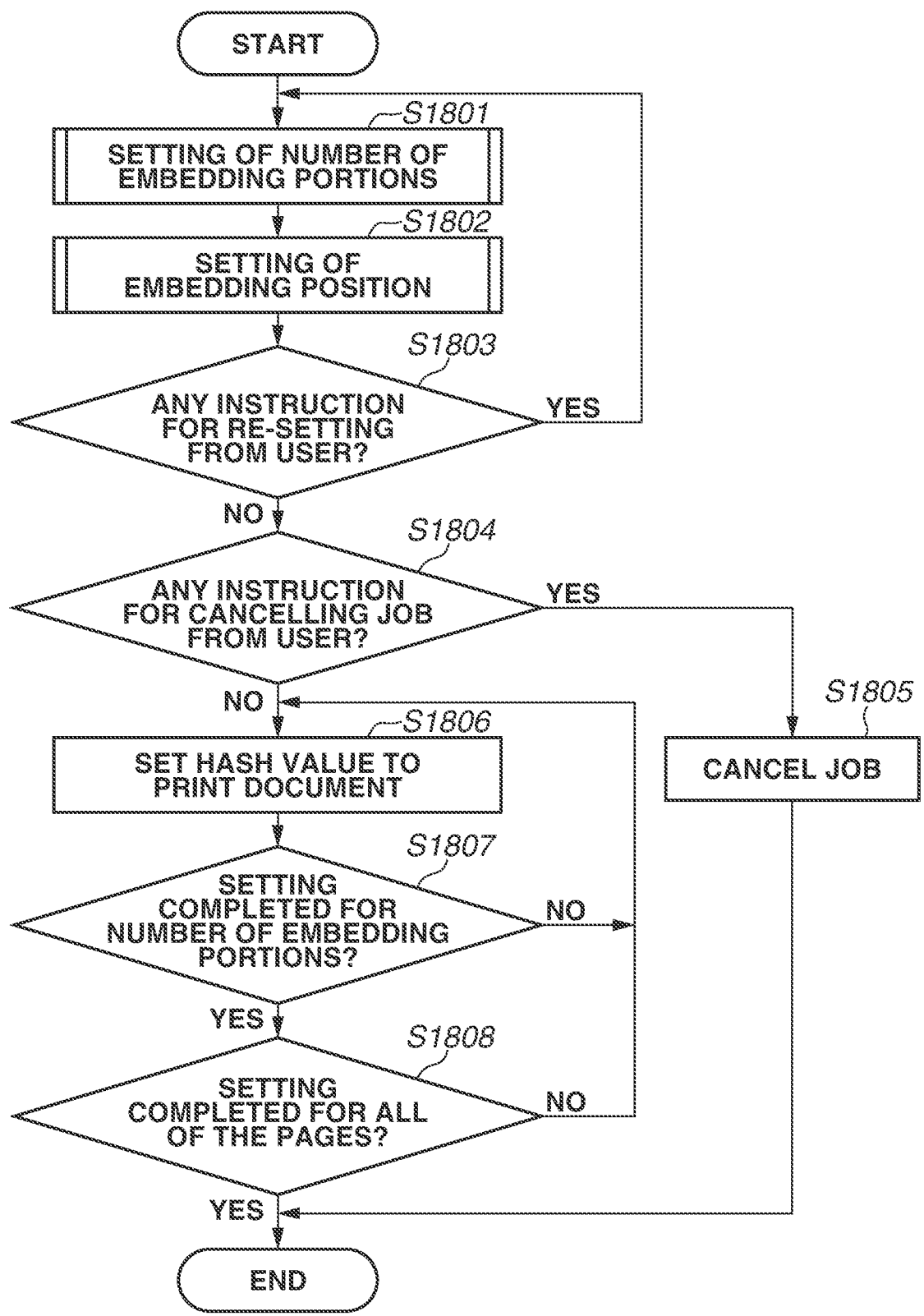
FIG. 13B is flowchart illustrating processing for printing a document by the image forming apparatus.

FIG. 13B to FIGS. 13F1 and 13F2 are flowcharts of the application A 404 of the image forming apparatus 101 performing embedding setting processing on a print document. The flowchart of FIG. 13B is invoked after the application A 404 calculates a hash value of the print document at the time of printing, and the application A 404 is executed by the CPU 201.

In S1801, the application A 404 performs setting processing for the number of embedding portions. This setting processing for the number of embedding portions is described below with reference to FIG. 13C. In S1802, the application A 404 performs setting processing for the embedding position. This setting processing for the embedding position is described below with reference to FIGS. 13F1 and 13F2. Upon completion of the setting processing for the embedding position, the application A 404 advances the processing to S1803. In S1803, the application A 404 determines whether an instruction for re-setting has been received from the user. In a case where, when the number-of-embedding-portions error screen 1100 or the embedding position error screen 1110 is displayed in setting of the number of embedding portions or setting of the embedding position, the to-BC function setting button 1103 has been selected, the application A 404 determines that an instruction for re-setting has been received from the user (YES in S1803) and then returns the processing to S1801. If it is determined that no instruction for re-setting has been received from the user (NO in S1803), the application A 404 advances the processing to S1804.

In S1804, the application A 404 determines whether an instruction for canceling print processing has been received from the user. In a case where, when the number-of-embedding-portions error screen 1100 or the embedding position error screen 1110 is displayed, the cancel button 1101 or the to-print setting button 1102 has been selected, the application A 404 determines that an instruction for canceling print processing has been received from the user (YES in S1804) and then advances the processing to S1805. If it is determined that no instruction for canceling has been received from the user (NO in S1804), the application A 404 advances the processing to S1806. In S1805, the application A 404 cancels print processing and, in a case where the to-print setting button 1102 has been selected in the number-of-embedding-portions error screen 1100 or the embedding position error screen 1110, calls up the printing screen 1000 of the application A 404 again.

In S1806, the application A 404 embeds the hash value calculated in S1511 in print data of the document according to the embedding position set in S1802. Moreover, the application A 404 performs this embedding processing on a page-by-page basis. Moreover, this hash value is information to be embedded with a format obtained by conversion in such a way as to be readable when being scanned as described below (for example, a barcode format), and becomes inquiry information for use in inquiring of the blockchain service about the presence or absence of registration. The hash value to be embedded here can be visible information, which the user is able to view, or can be invisible information, which the user is unable to view, and can be any form as long as it is an embedded image which is able to be embedded in paper. In the case of intending to expressly indicate that registration is present in the blockchain service, it is desirable that the hash value be embedded as visible information, for example, as a two-dimensional barcode. Alternatively, in the case of intending not to disturb the visual quality of a document by embedding inquiry information therein, it is desirable that inquiry information be embedded as invisible information. For example, performing printing with extremely small toner or ink patterned in such a way as to be invisible by the user enables embedding inquiry information as invisible information in a document. The other usable embedded images can be any form of embedded image as long as inquiry information, i.e., document information, is recorded on a printed product. Ideally, a form of embedded image which enables any manufacturer's image forming apparatus to acquire document information recorded on paper is desirable.

If, in S1807, it is determined that setting of the hash value to the print document is unfinished for the number of embedding portions set in S1801 (NO in S1807), the application A 404 returns the processing to S1806. S1807 is also determination processing performed on a page-by-page basis as with S1806. If it is determined that setting of the hash value to the print document for the number of embedding portions has been completed (YES in S1807), the application A 404 advances the processing to S1808. In S1808, in a case where the print document has a plurality of pages, the application A 404 determines whether setting of the hash value has been completed for all of the pages. If it is determined that there is a page in which setting of the hash value is not yet performed (NO in S1808), the application A 404 returns the processing to S1806, and, if it is determined that setting of the hash value has been completed for all of the pages (YES in S1808), the application A 404 ends the processing for embedding setting in the print document in the present flowchart. In this way, it is possible to, upon performing setting of the number of embedding portions and setting of the embedding position, embed inquiry information for the required number of embedding portions in each page of the print document.

Figure 13C:
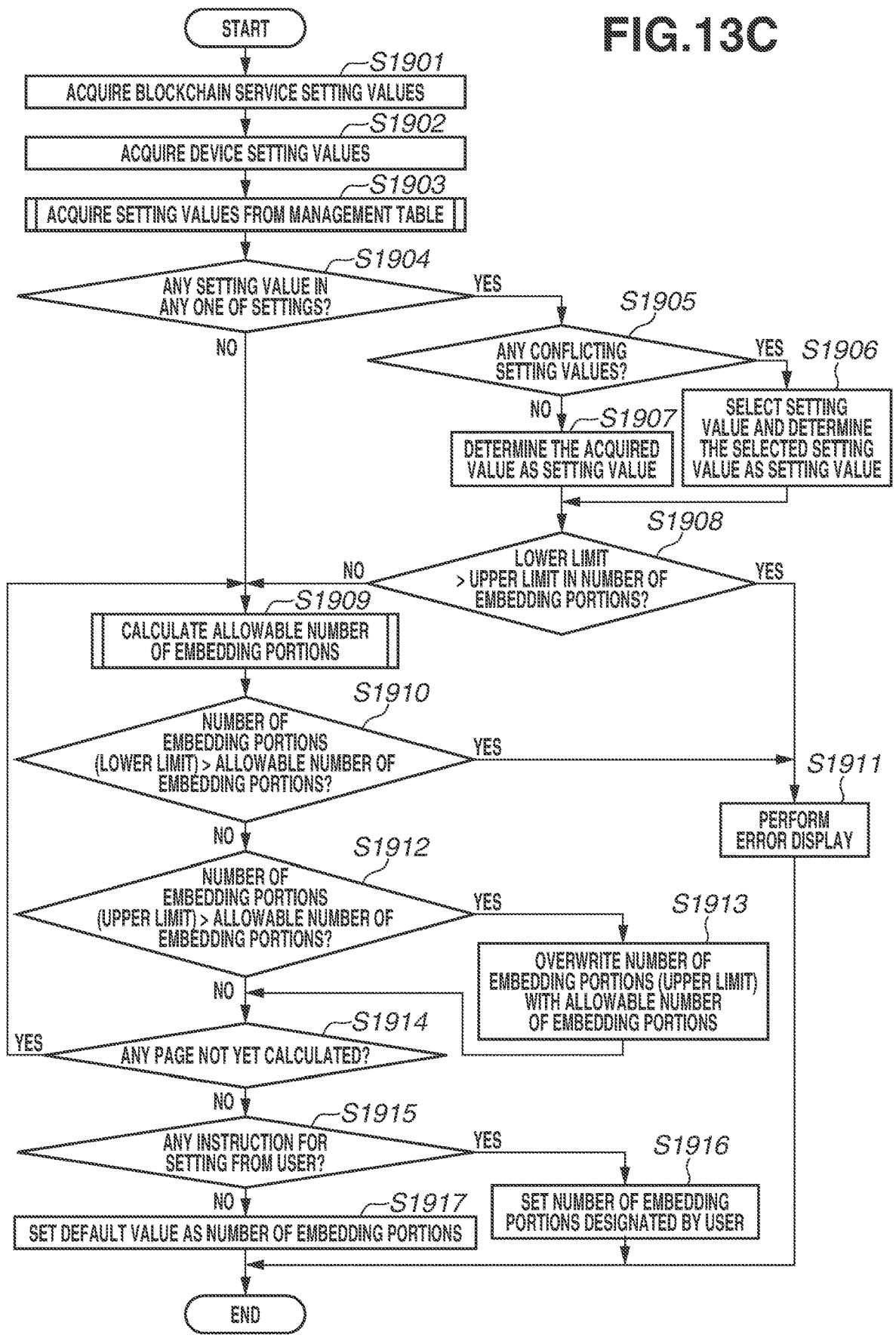
FIG. 13C is flowchart illustrating processing for printing a document by the image forming apparatus.

The flowchart of FIG. 13C is invoked when the application A 404 performs setting processing of the number of embedding portions, and the application A 404 is executed by the CPU 201. In S1901, the application A 404 acquires blockchain service setting values from the blockchain apparatus 111. Setting items to be acquired are the same as the setting items related to the blockchain function shown in Table 2. In S1902, the application A 404 acquires setting values related to the blockchain function in the device setting shown in Table 2. Then, in S1903, the application A 404 acquires, from the management table shown in Table 3, setting values related to the blockchain function conforming to the state obtained at the time of execution of the present flowchart. Acquisition of settings from the management table is described below with reference to FIG. 13D. If, in S1904, there is a setting value in any one of setting of the blockchain service, device setting, and setting of the management table conforming to the state obtained at the time of execution (YES in S1904), the application A 404 advances the processing to S1905, and, if there is no such setting value (NO in S1904), the application A 404 advances the processing to S1909.

In S1905, the application A 404 determines whether there are conflicting setting values, excluding, for example, "*", set with respect to the same setting item. If it is determined that there are conflicting setting values set with respect to the same setting item (YES in S1905), the application A 404 advances the processing to S1906, and, if it is determined that there are no conflicting setting values set with respect to the same setting item (NO in S1905), the application A 404 advances the processing to S1907. In S1906, in a case where the item with respect to which there are conflicting setting values is setting of "Number of embedding portions (lower limit)", the application A 404 selects the maximum setting value out of the setting values, and, in a case where the item with respect to which there are conflicting setting values is setting of "Number of embedding portions (upper limit)", the application A 404 selects the minimum setting value out of the setting values. In a case where the item with respect to which there are conflicting setting values is setting of "User designation of embedding position", if there is at least one setting value of "Unallowable", the application A 404 selects and determines "Unallowable". In a case where the item with respect to which there are conflicting setting values is setting of "Adjacence or bias of embedding positions", if there is at least one setting value of "Unallowable", the application A 404 selects and determines "Unallowable". If there is no setting value of "Unallowable" and there is at least one setting value of "Warning display", the application A 404 selects and determines "Warning display". Furthermore, in a case where there is only one setting item with respect to which there are conflicting setting values and there are no conflicting setting values with respect to the other setting items, the application A 404 determines a setting value acquired as usual.

While, here, selection in order of priority is performed with respect to the setting values, the selection criterion does not need to be limited to this, and a method in which degrees of priority are set to the respective states shown in Table 3 and a high-priority setting value is employed is conceivable. For example, in a case where "give top priority to setting security policy" is made the first priority and a security policy of "Forcibly set number of embedding portions as plurality" is set, the "Number of embedding portions (lower limit)" is set to "3". Moreover, a method of acquiring settings related to embedding set in the blockchain service and using them in combination with the conditions shown in Table 3 is also conceivable.

In S1907, the application A 404 selects and determines the acquired setting value in the setting item with respect to which setting has been performed. In S1908, the application A 404 determines whether there is setting of the number of embedding portions (lower limit) or the number of embedding portions (upper limit) out of the settings and the number of embedding portions (lower limit) exceeds the number of embedding portions (upper limit). If it is determined that the number of embedding portions (lower limit) exceeds the number of embedding portions (upper limit) (YES in S1908), the application A 404 advances the processing to S1911, and, if it is determined that the number of embedding portions (lower limit) does not exceed the number of embedding portions (upper limit) (NO in S1908), the application A 404 advances the processing to S1909.

In S1909, the application A 404 calculates the allowable number of embedding portions, which is the maximum number of portions at which embedding is able to be performed in a print document. The calculation processing is described below with reference to FIG. 13E. In S1910, the application A 404 determines whether there is setting of the number of embedding portions (lower limit) and the setting value of the number of embedding portions (lower limit) exceeds the allowable number of embedding portions calculated in S1909. In a case where there is not setting of the number of embedding portions (lower limit), the application A 404 sets "1" and thus performs determination in S1910. If it is determined that the setting value of the number of embedding portions (lower limit) exceeds the allowable number of embedding portions (YES in S1910), the application A 404 advances the processing to S1911, and, if it is determined that the setting value of the number of embedding portions (lower limit) does not exceed the allowable number of embedding portions (NO in S1910), the application A 404 advances the processing to S1912. In S1911, the application A 404 displays the number-of-embedding-portions error screen 1100 and then ends execution of the present flowchart. In S1912, the application A 404 determines whether the setting value of the number of embedding portions (upper limit) exceeds the allowable number of embedding portions. In a case where there is not setting of the number of embedding portions (upper limit) or if it is determined that the setting value of the number of embedding portions (upper limit) exceeds the allowable number of embedding portions (YES in S1912), the application A 404 advances the processing to S1913, and, if it is determined that the setting value of the number of embedding portions (upper limit) does not exceed the allowable number of embedding portions (NO in S1912), the application A 404 advances the processing to S1914. In S1913, the application A 404 overwrites the setting value of the number of embedding portions (upper limit) with the allowable number of embedding portions calculated in S1909. The application A 404 performs processing in S1909 to S1913 on a page-by-page basis.

If, in S1914, it is determined that there is a page in which the allowable number of embedding portions is not yet calculated (YES in S1914), the application A 404 returns the processing to S1909, and, if, in S1914, it is determined that calculation of the allowable number of embedding portions has been completed for all of the pages (NO in S1914), the application A 404 advances the processing to S1915. In S1915, the application A 404 displays the BC function setting screen 1010. Here, the application A 404 displays the range of value in the enterable number range 1012 as the number of embedding portions (lower limit) and the number of embedding portions (upper limit). In a case where an instruction for setting the number of embedding portions in the number-of-embedding-portions setting area 1011 has been received from the user and the OK button 1015 has been pressed (YES in S1915), the application A 404 advances the processing to S1916. In a case where the OK button 1015 has been pressed in a state in which there is no instruction for setting in the number-of-embedding-portions setting area 1011 or in a state in which there is no change from the default display (NO in S1915), the application A 404 advances the processing to S1917. In S1916, the application A 404 sets setting of the number of embedding portions designated by the user as the number of embedding portions. In S1917, the application A 404 determines, as the number of embedding portions, the default value displayed in the number-of-embedding-portions setting area 1011 or the enterable number range 1012 in the BC function setting screen 1010. Upon completion of setting of the number of embedding portions in S1916 or S1917, the application A 404 ends the present flowchart.

In this way, upon acquiring settings from the management table corresponding to the states of the blockchain service, device setting, and print processing, it is possible to acquire settings related to the number of embedding portions and the embedding position to determine the number of embedding portions. Then, upon limiting the set range of from the number of embedding portions (lower limit) to the number of embedding portions (upper limit), it is possible to receive an instruction for setting of the number of embedding portions from the user. Additionally, in a case where the setting condition is not able to be satisfied, for example, in a case where embedding is not able to be performed for the number of embedding portions set in the number of embedding portions (lower limit), it is possible to display the number-of-embedding-portions error screen 1100 to inform the user of an error.

Furthermore, while there is provided S1916 for determining the number of embedding portions and the embedding position by setting performed by the user, for example, any one of pieces of setting information checked in S1904 or the number of embedding portions and the embedding position determined until S1913 can be directly used as the setting value. While, as mentioned above, the number of embedding portions has an upper limit and a lower limit, in that case, any one of them can be employed according to the device setting or an instruction from the blockchain service. Here, the point is that it is possible to perform setting related to embedding without the need for user setting.

Figure 13D:
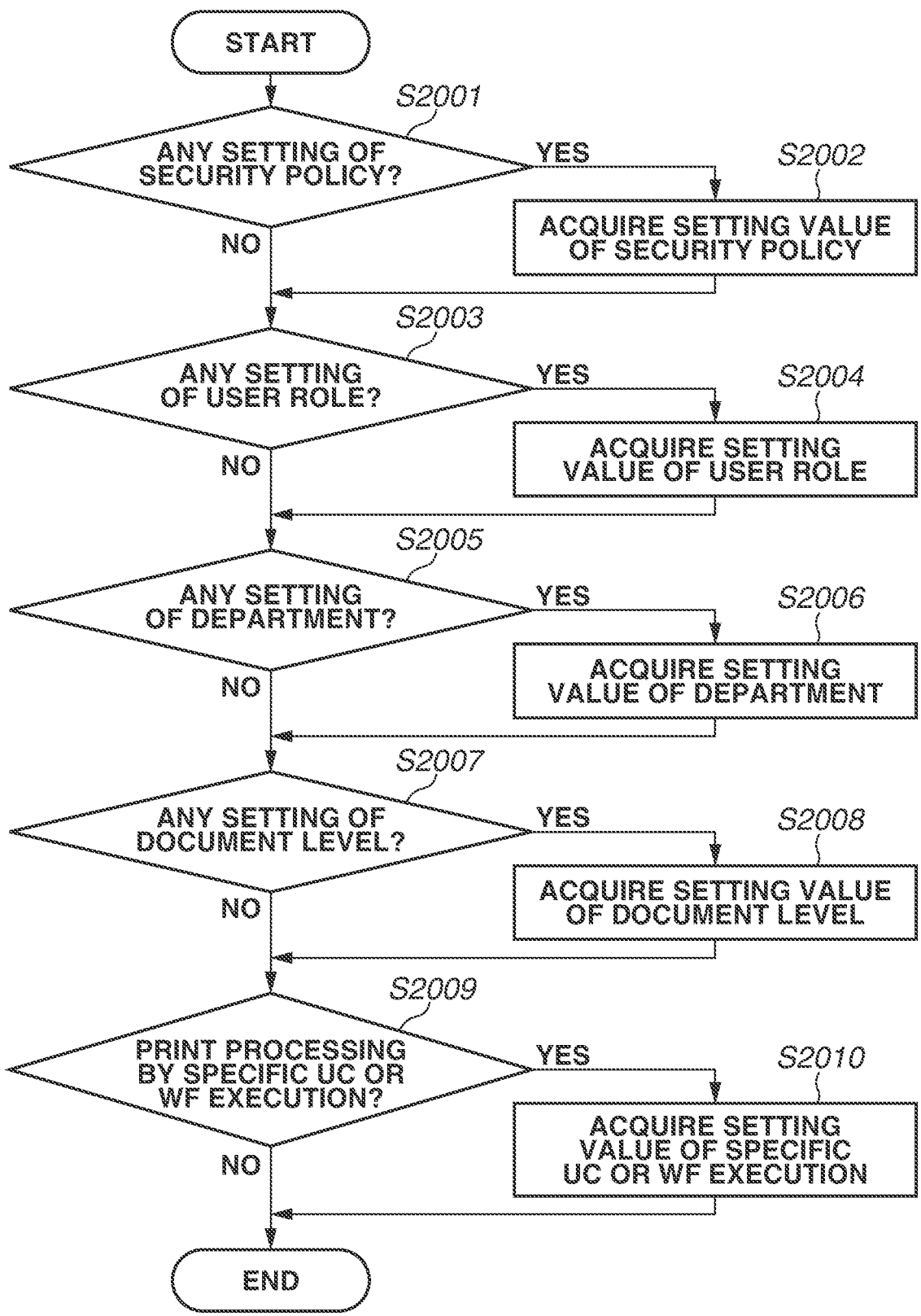
FIG. 13D is flowchart illustrating processing for printing a document by the image forming apparatus.

The flowchart of FIG. 13D is invoked when the application A 404 acquires, from the blockchain setting unit 421, settings conforming to the state of execution at the time of determining the number of embedding portions. The settings to be acquired from the blockchain setting unit 421 are included in the management table shown in table 3. The application A 404 is executed by the CPU 201. In S2001, the application A 404 determines whether there is at least one setting of the security policy. If it is determined that there is at least one setting of the security policy (YES in S2001), the application A 404 advances the processing to S2002, and, if it is determined that there is no setting of the security policy (NO in S2001), the application A 404 advances the processing to S2003. In S2002, the application A 404 acquires a setting value of the blockchain function conforming to the security policy. For example, in a case where "Forcibly set number of embedding portions as plurality" is enabled as the security policy, the application A 404 acquires, as setting values, "3" as the number of embedding portions and "*" as the other setting item values from the management table shown in Table 3. In a case where "Tighten security of embedding position" is enabled, the application A 404 acquires, as setting values, "Fixed position not allowed" as the fixed setting of embedding position, "Unallowable" as the user designation setting of embedding position, and "*" as the other setting item values. Upon acquiring the setting value, the application A 404 advances the processing to S2003.

In S2003, the application A 404 determines whether there is a role set for the user who has logged in in S1503. If it is determined that there is a role (YES in S2003), the application A 404 advances the processing to S2004, and, if it is determined that there is no role (NO in S2003), the application A 404 advances the processing to S2005. In S2004, the application A 404 acquires a setting value of the blockchain function corresponding to the user role. Upon acquiring the setting value, the application A 404 advances the processing to S2005.

In S2005, the application A 404 determines whether there is setting of a department to which the user who has logged in in S1503 belongs. If it is determined that there is setting of a department for the user (YES in S2005), the application A 404 advances the processing to S2006, and, if it is determined that there is not setting of a department for the user (NO in S2005), the application A 404 advances the processing to S2007. In S2006, the application A 404 acquires a setting value of the blockchain function corresponding to the department for the user. Upon acquiring the setting value, the application A 404 advances the processing to S2007. In S2007, the application A 404 determines whether there is setting related to the document level in a document to be printed. If it is determined that there is setting of the document level (YES in S2007), the application A 404 advances the processing to S2008, and, if it is determined that there is not setting of the document level (NO in S2007), the application A 404 advances the processing to S2009. In S2008, the application A 404 acquires a setting value of the blockchain function corresponding to the document level. Upon acquiring the setting value, the application A 404 advances the processing to S2009.

In S2009, the application A 404 determines whether the print processing is based on a specific UC or WF execution. If it is determined that the print processing is based on a specific UC or WF execution (YES in S2009), the application A 404 advances the processing to S2010. In S2010, the application A 404 acquires a setting value of the blockchain function corresponding to the specific UC or WF execution. Upon acquiring setting items conforming to the respective states in the management table shown in Table 3, the application A 404 ends the present flowchart. In this way, acquiring a setting value conforming to the state from the management table enables acquiring a setting value corresponding to the state obtained at the time of execution of the print processing.

Figure 13E:
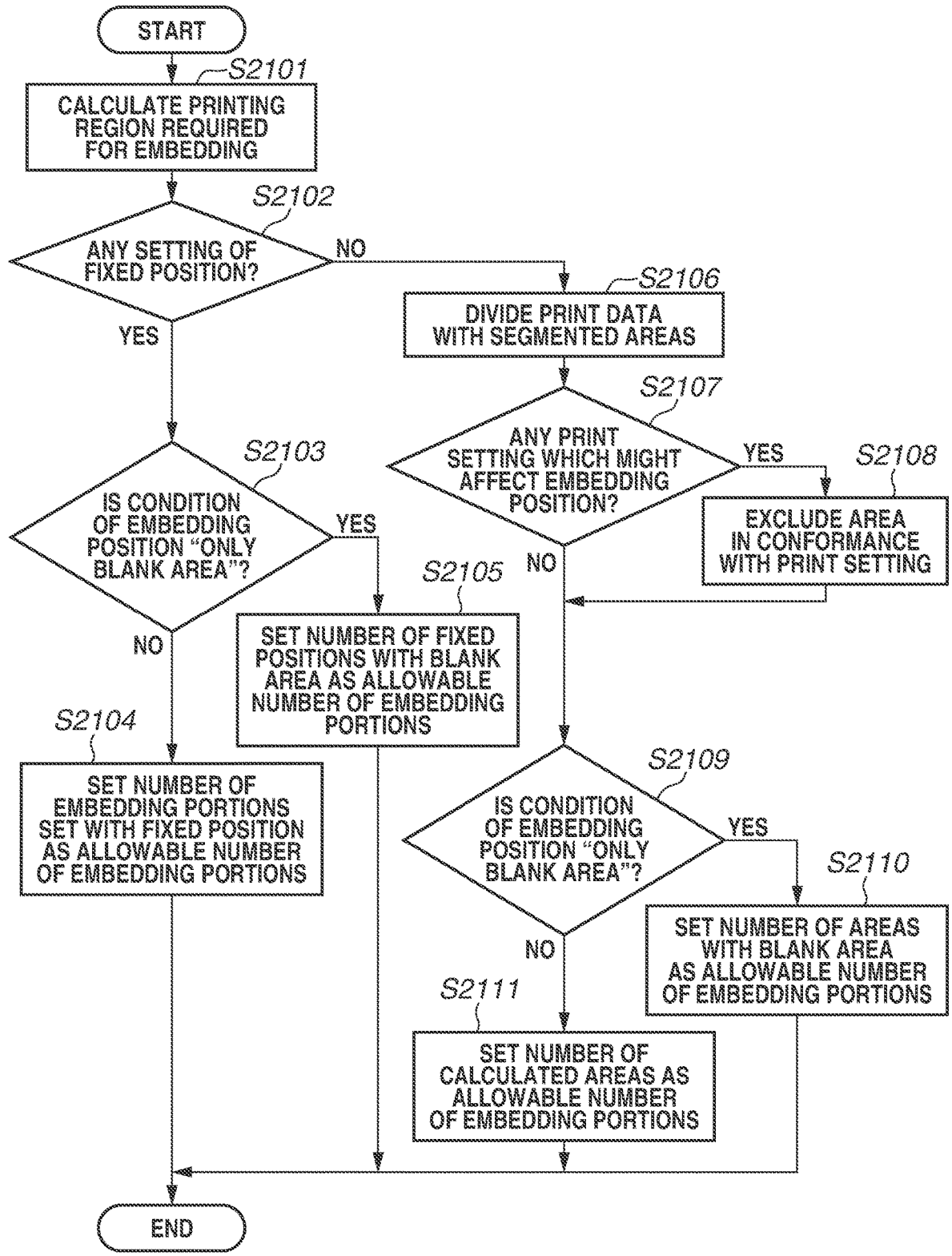
FIG. 13E is flowchart illustrating processing for printing a document by the image forming apparatus.

The flowchart of FIG. 13E is invoked when the application A 404 calculates the allowable number of embedding portions, and the application A 404 is executed by the CPU 201. In S2101, the application A 404 calculates a printing region required for embedding a document hash value as inquiry information at one portion. Upon calculating the printing region, the application A 404 advances the processing to S2102.

In S2102, the application A 404 determines whether there is setting of the fixed position in the setting values acquired in S1901, S1902, and S1903. If it is determined that there is setting of the fixed position (YES in S2102), the application A 404 advances the processing to S2103, and, if is determined that there is no setting of the fixed position (NO in S2102), the application A 404 advances the processing to S2106. In S2103, the application A 404 determines whether there is setting in which "Only blank area" is set as the condition of embedding position in the setting values acquired in S1901, S1902, and S1903. If it is determined that there is such setting (YES in S2103), the application A 404 advances the processing to S2105, and, if it is determined that there is not such setting (NO in S2103), the application A 404 advances the processing to S2104. In S2104, the application A 404 sets, as the allowable number of embedding portions, the number of embedding positions set with the fixed position. In S2105, the application A 404 sets, as the allowable number of embedding portions, the number of positions in each of which there is a blank area, only for the required printing region calculated in S2101, out of the number of embedding positions set with the fixed position.

In S2106, the application A 404 divides print data of the document with segmented areas. The method of division can include, for example, a method of performing division using the printing region calculated in S2101 or a method of previously defining a segment size for each paper size for use in printing and performing division according to that definition. In S2107, the application A 404 determines whether there is a print setting which might affect the embedding position. For example, the application A 404 determines whether there is a print setting which might contribute to breakage of inquiry information by finish processing after printing, such as staple setting, punching setting, or setting of a binding margin. If it is determined that there is such a print setting (YES in S2107), the application A 404 advances the processing to S2108, and, if it is determined that there is not such a print setting (NO in S2107), the application A 404 advances the processing to S2109.

In S2108, the application A 404 excludes an area which the print setting might affect, from the areas segmented in S2106. In S2109, the application A 404 determines whether there is setting in which "Only blank area" is set as the condition of embedding position in the setting values acquired in S1901, S1902, and S1903. If it is determined that there is such setting (YES in S2109), the application A 404 advances the processing to S2110, and, if it is determined that there is not such setting (NO in S2109), the application A 404 advances the processing to S2111. In S2110, the application A 404 sets, as the allowable number of embedding portions, the number of areas in each of which there is a blank area, only for the required printing region calculated in S2101, out of the areas calculated in S2106 and S2108. In S2111, the application A 404 sets, as the allowable number of embedding portions, the number of areas calculated in S2106 and S2108. Upon completion of setting of the allowable number of embedding portions, the application A 404 ends the present flowchart.

In this way, since a printing region required for embedding inquiry information at one portion varies depending on the amount of embedded image or the embedding method, the application A 404 calculates the required printing region in S2101. Then, the application A 404 is able to calculate the allowable number of embedding portions according to a setting related to the embedding position, a print setting, or a blank area of a document to be printed.

The flowcharts of FIGS. 13F1 and 13F2 are invoked when the application A 404 sets the embedding position, and the application A 404 is executed by the CPU 201. In S2201, the application A 404 determines whether there is setting in which "Only blank area" is set as the condition of embedding position in the setting values acquired in S1901, S1902, and S1903. If it is determined that there is such setting (YES in S2201), the application A 404 advances the processing to S2209, and, if it is determined that there is not such setting (NO in S2201), the application A 404 advances the processing to S2202.

In S2202, the application A 404 determines whether there is setting of the fixed position in the setting values acquired in S1901, S1902, and S1903. If it is determined that there is setting of the fixed position (YES in S2202), the application A 404 advances the processing to S2211, and, if is determined that there is no setting of the fixed position (NO in S2202), the application A 404 advances the processing to S2203.

In S2203, the application A 404 divides print data of the document with segmented areas. In S2204, the application A 404 determines whether there is a print setting which might affect the embedding position. The determination as to whether there is a print setting which might affect the embedding position is performed in the same manner as that in S2107. If it is determined that there is such a print setting (YES in S2204), the application A 404 advances the processing to S2205, and, if it is determined that there is not such a print setting (NO in S2204), the application A 404 advances the processing to S2206. In S2205, the application A 404 excludes an area which the print setting might affect, from the areas segmented in S2203. Then, in S2206, the application A 404 determines whether, in a case where areas not adjacent to each other are selected from the areas calculated in S2203 and S2205, the number of embedding portions set in S1801 exceeds the number of areas not adjacent to each other selected. If it is determined that the number of embedding portions exceeds the number of areas not adjacent to each other (YES in S2206), the application A 404 advances the processing to S2207, and, if it is determined that the number of embedding portions does not exceed the number of areas not adjacent to each other (NO in S2206), the application A 404 advances the processing to S2208.

In S2207, the application A 404 determines embedding positions from the areas calculated in S2203 and S2205, only for the number of embedding portions set in S1801. The method of determining the embedding positions can include a method of storing coordinates of the positions for embedding and a method of, in the case of selection from the areas, storing, for example, area identification numbers. The embedding positions to be determined in S2207 are brought into a state in which adjacent positions are included. In S2208, the application A 404 determines, as the embedding positions, areas not adjacent to each other, from the areas calculated in S2203 and S2205, only for the number of embedding portions set in S1801.

In S2209, the application A 404 determines whether there is setting of the fixed position in the setting values acquired in S1901, S1902, and S1903. If it is determined that there is setting of the fixed position (YES in S2209), the application A 404 advances the processing to S2210, and, if is determined that there is no setting of the fixed position (NO in S2209), the application A 404 advances the processing to S2213. In S2210, the application A 404 determines whether there is a blank area in the set fixed position. If it is determined that there is sufficiently a blank area (YES in S2210), the application A 404 advances the processing to S2211, and, if it is determined that there is no blank area (NO in S2210), the application A 404 advances the processing to S2212. In S2211, the application A 404 determines the set fixed position as the embedding position. In S2212, the application A 404 displays the embedding position error screen 1110.

In S2213, the application A 404 divides print data of the document with segmented areas. In S2214, the application A 404 determines whether there is a print setting which might affect the embedding position. The determination as to whether there is a print setting which might affect the embedding position is performed in the same manner as that in S2107. If it is determined that there is such a print setting (YES in S2214), the application A 404 advances the processing to S2215, and, if it is determined that there is not such a print setting (NO in S2214), the application A 404 advances the processing to S2216. In S2215, the application A 404 excludes an area which the print setting might affect, from the areas segmented in S2213. Then, in S2216, the application A 404 selects areas in each of which there is sufficiently a blank area, from the areas calculated in S2213 and S2215, brings together areas in each of which there is a blank are into one blank area group, and calculates the number of blank area groups. Here, in a case where there are areas not adjacent to each other, the areas belong to respective different groups.

In S2217, the application A 404 determines whether the number of embedding portions set in S1801 exceeds the number of blank area groups. If it is determined that the number of embedding portions exceeds the number of blank area groups (YES in S2217), the application A 404 advances the processing to S2219, and, if it is determined that the number of embedding portions does not exceed the number of blank area groups (NO in S2217), the application A 404 advances the processing to S2218. In S2218, the application A 404 determines embedding positions in such a manner that not more than one embedding position is set for each group out of the groups calculated in S2216. In S2219, the application A 404 determines whether the number of embedding portions set in S1801 exceeds the number of areas in each of which there are blank areas not adjacent to each other. The number of areas in each of which there are blank areas not adjacent to each other is calculated by selecting areas in each of which there are sufficiently blank areas not adjacent to each other out of the areas calculated in S2213 and S2215 and counting the selected areas. If it is determined that the number of embedding portions exceeds the number of areas in each of which there are blank areas not adjacent to each other (YES in S2219), the application A 404 advances the processing to S2220, and, if it is determined that the number of embedding portions does not exceed the number of areas in each of which there are blank areas not adjacent to each other (NO in S2219), the application A 404 advances the processing to S2221. In S2220, the application A 404 determines embedding positions from areas in which there are sufficiently blank areas out of the areas calculated in S2213 and S2215, only for the number of embedding portions set in S1801. The embedding positions to be determined in S2220 are brought into a state in which adjacent positions are included.

In S2221, the application A 404 determines, as the embedding positions, areas in each of which there are sufficiently blank areas not adjacent to each other from the areas in which there are sufficiently blank areas out of the areas calculated in S2213 and S2215, only for the number of embedding portions set in S1801. After determining the embedding positions or after displaying the embedding position error screen 1110 in S2212, the application A 404 advances the processing to S2230.

In S2230, the application A 404 determines whether a setting error of the embedding position has occurred. In the case of having performed processing in S2212, the application A 404 determines that a setting error of the embedding position has occurred (NO in S2230) and then ends the present flowchart. Alternatively, in a case where there is a bias in the set embedding positions and, in the setting values acquired in S1901, S1902, and S1903, there is setting of not allowing the adjacence or bias of embedding positions, the application A 404 determines that a setting error of the embedding position has occurred. In that case, the application A 404 displays the embedding position error screen 1110 and then ends the present flowchart.

Here, in a case where coordinates or areas of the set embedding positions are biased toward one end, are biased toward nearby horizontal axis coordinates or nearby vertical axis coordinates, or are biased toward a position near specific coordinates, the application A 404 determines that there is a bias in the set embedding positions. If it is determined that such a setting error has not occurred (YES in S2230), the application A 404 advances the processing to S2231. In S2231, the application A 404 determines whether there is an adjacence or bias in the set embedding positions and there is setting of providing warning display in a case where there is an adjacence or bias in the set embedding positions in the setting values acquired in S1901, S1902, and S1903. The determination as to whether there is an adjacence or bias in the set embedding positions is similar to that in S2230. If it is determined that there is an adjacence or bias in the set embedding positions and there is setting of providing warning display (YES in S2231), the application A 404 advances the processing to S2232, and, otherwise (NO in S2231), the application A 404 advances the processing to S2233. In S2232, the application A 404 displays the embedding position warning screen 1120 to warn the user about there being an adjacence or bias.

In S2233, the application A 404 determines whether there is a restriction by the fixed position setting or an allowance of the user designation of the embedding position in the setting values acquired in S1901, S1902, and S1903. If it is determined that there is an allowance of the user changing the fixed position (YES in S2233), the application A 404 advances the processing to S2234, and, if it is determined that the user designation is set as unallowable (NO in S2233), the application A 404 ends the present flowchart. In S2234, the application A 404 determines whether there is setting in which "Only blank area" is set as the condition of embedding position in the setting values acquired in S1901, S1902, and S1903. If it is determined that there is such setting (YES in S2234), the application A 404 advances the processing to S2236, and, if it is determined that there is not such setting (NO in S2234), the application A 404 advances the processing to S2235. In S2235, the application A 404 displays the embedding position setting button 1016 and, in a case where the embedding position setting button 1016 has been pressed by the user, displays the embedding position setting screen 1020 without limiting positions which the user is allowed to designate. Here, in a case where there is a print setting which might affect the embedding position, the application A 404 can display such a position in the embedding position setting area 1021.

In S2236, the application A 404 determines whether there is an area in which there is sufficiently a blank area not yet selected out of the areas calculated in S2213 and S2215. If it is determined that there is an area in which there is sufficiently a blank area not yet selected (YES in S2236), the application A 404 advances the processing to S2237, and, if it is determined that there is no area in which there is sufficiently a blank area not yet selected (NO in S2236), the application A 404 ends the present flowchart. In S2237, the application A 404 displays the embedding position setting button 1016 and, in a case where the embedding position setting button 1016 has been pressed by the user, displays the embedding position setting screen 1020 in the state of imposing such a restriction as to set the area in which there is sufficiently a blank area not yet selected as a position which the user is allowed to designate. Then, the application A 404 advances the processing to S2238. In S2238, the application A 404 determines whether an instruction for setting the embedding position has been received from the user. If it is determined that such a setting instruction has been received (YES in S2238), the application A 404 advances the processing to S2239, and, if it is determined that such a setting instruction has not been received (NO in S2238), the application A 404 ends the present flowchart. In S2239, the application A 404 changes the embedding position to a position which the user has issued an instruction for setting and determines such a position as the embedding position. Upon completion of setting of the embedding position, the application A 404 ends the present flowchart.

In this way, it becomes possible to set an embedding position corresponding to settings of the management table conforming to the states of the blockchain service, device setting, and print processing. Additionally, in a case where there is a print setting which might affect the embedding position, it is possible to set the embedding position to a position which is not affected. Moreover, if areas not adjacent to each other are determined as the embedding position, it is possible to set the embedding position in such way as to avoid biased positions. Moreover, even in a case where the embedding position is able to be set to only the biased positions, it is possible to display the warning screen to inform the user of a warning. Similarly, even in a case where a situation in which no embedding position is able to be set has occurred, it is possible to display an error screen to inform the user of an error. In a case where a situation in which the user is able to set the embedding position has occurred, it is also possible to display the embedding position setting screen 1020 to the user and receive a setting instruction from the user.

Figure 14:
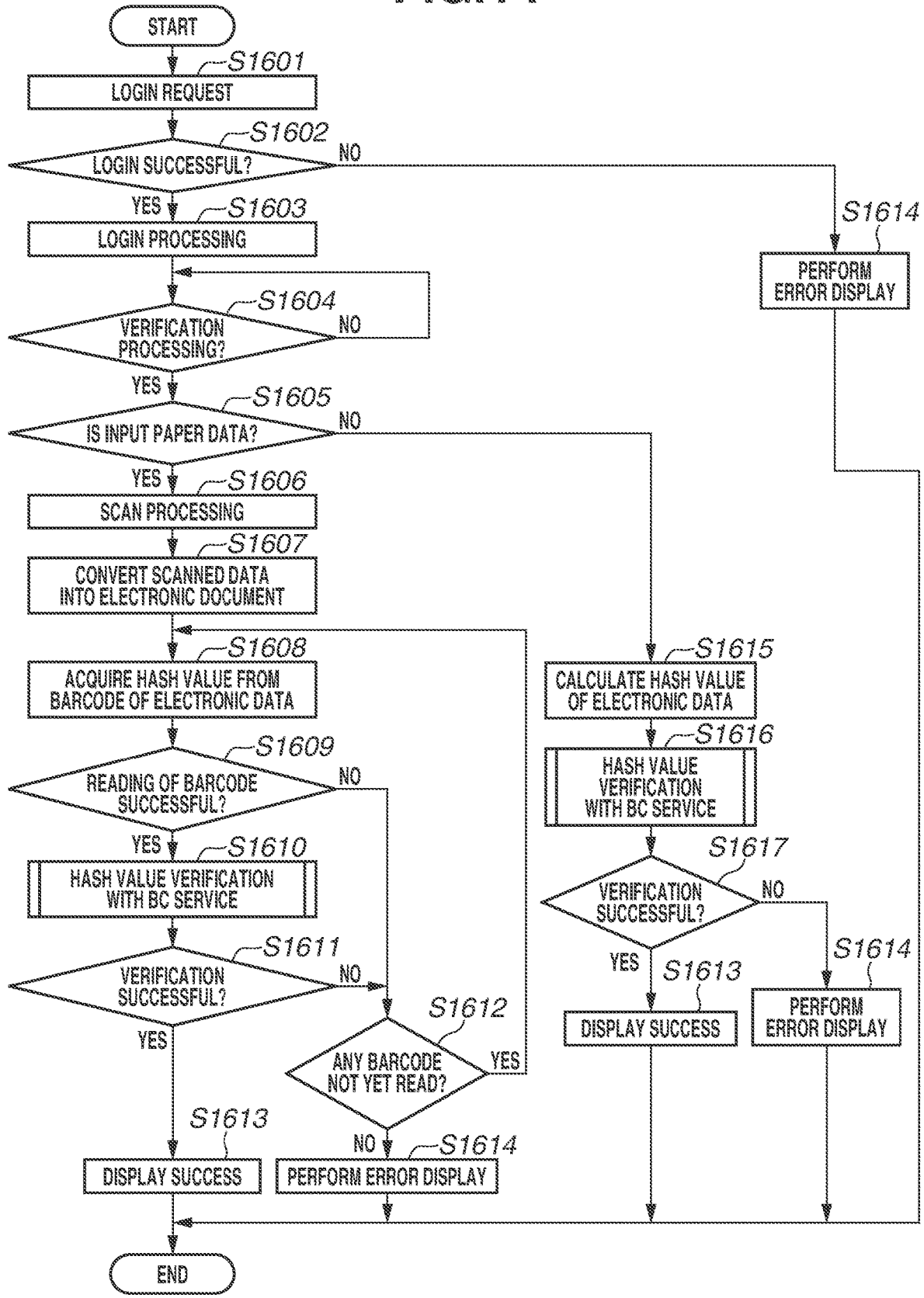
FIG. 14 is a flowchart illustrating processing for verifying a document.

FIG. 14 is a flowchart illustrating processing for performing verification processing on a document file designated by the user or a printed paper document with the image forming apparatus 101. The present flowchart is started by the login button 703 or the guest login button 711 being pressed in the authentication screen 700 of the image forming apparatus 101 illustrated in FIG. 7A, and, first, the user authentication processing unit 402 is executed by the CPU 201. At the time of starting of the present flowchart, a user name and a password entered by the user of the image forming apparatus 101 via the authentication screen 700 are passed to the user authentication processing unit 402.

In S1601, the user authentication processing unit 402 receives the user name and the password as a login request. In S1602, the user authentication processing unit 402 checks whether the received user name and password match a user name and password included in the user information table shown in Table 1, and, if it is determined that the received user name and password match a user name and password included in the user information table (YES in S1602), the user authentication processing unit 402 determines that the user authentication is successful and then advances the processing to S1603. If it is determined that the received user name and password do not match a user name and password included in the user information table (NO in S1602), the user authentication processing unit 402 determines that the user authentication is failed and then advances the processing to S1614.

In S1603, the user authentication processing unit 402 performs login processing to store the user name received in S1601 as the currently logged-in user in the RAM 203, and then passes the processing to the local UI control unit 400. The local UI control unit 400, which has taken over the processing, displays the function selection screen 900 on the operation unit 209. In the present flowchart, after that, in the function selection screen 900, the document verification button is pressed by the user, and, with respect to the subsequent processing, the application A 404 is executed by the CPU 201. The application A 404, which has taken over the processing, displays the verification screen 1200 on the operation unit 209.

In S1604, the application A 404 displays the verification screen 1200 illustrated in FIG. 12A on the operation unit 209 via the operation unit I/F 205 and waits for the verify button 1203 to be pressed, and, if it is determined that the verify button 1203 has been pressed (YES in S1604), the application A 404 advances the processing to S1605. In S1605, the application A 404 determines whether a target document selected by the user in the document selection setting 1201 is paper data. If it is determined that the target document is paper data (YES in S1605), the application A 404 advances the processing to S1606, and, if it is determined that the target document is electronic data (NO in S1605), the application A 404 advances the processing to S1615.

In S1606, the application A 404 performs scan processing on a paper document set on the image forming apparatus 101. In the scan processing, the application A 404 causes the scanner 211 to read the paper document via the scanner I/F 207, thus generating image data. In a case where a printed product obtained by performing printing based on a document with a plurality of embedded images embedded therein has been scanned, since a plurality of embedded images is included in the image data, the image forming apparatus 101 results in detecting a plurality of embedded images. In subsequent processing in the present flowchart, a barcode is taken as an example of code.

In S1607, the application A 404 converts the image data generated by scanner 211 into electronic data, and then temporarily stores the electronic data in the HDD 204. The application A 404 deletes such temporary data at the time of ending of the present flowchart. In S1608, the application A 404 reads a barcode from electronic data stored in the HDD 204 in S1607, and decodes the barcode to acquire a hash value embedded in the source document. This hash value serves as a document hash value which is used in S1610 described below. In this acquisition processing, the application A 404 performs processing for acquiring a hash value coordinating with the above-mentioned method in which a hash value is embedded in S1806 in the printing flowchart described above with reference to FIG. 13B. In S1609, the application A 404 determines whether barcode decoding processing in S1608 is successful. In a case where the barcode is not able to be recognized or is not able to be decoded, the application A 404 determines that the acquisition of a hash value from the barcode is failed (NO in S1609) and then advances the processing to S1612, and, if it is determined that the acquisition of a hash value from the barcode is successful (YES in S1609), the application A 404 advances the processing to S1610.

In S1610, the blockchain application 406 performs document verification processing using transaction information recorded in the blockchain apparatus 111. The document verification processing is described below with reference to FIG. 15. At that time, the type of processing set as document verification, a document hash value acquired in S1608, and the credential information A 408 are passed to the blockchain application 406. In S1611, upon receiving a response indicating a result of the requested processing, the application A 404 determines a verification result. If it is determined that verification is failed (NO in S1611), the application A 404 advances the processing to S1612, and, if it is determined that verification is successful (YES in S1611), the application A 404 advances the processing to S1613.

In S1612, the application A 404 determines whether there is a barcode not yet read in S1608. If it is determined that there is a barcode not yet read (YES in S1612), the application A 404 returns the processing to S1608, and, if it is determined that all of the barcodes have been read or there are no more readable barcodes (NO in S1612), the application A 404 advances the processing to S1614. In S1615, the application A 404 specifies electronic data stored in the HDD 204 selected by the user, and calculates a hash value of the electronic data. This hash value serves as a document hash value which is used in S1616 described below.

In S1616, the blockchain application 406 performs document verification processing using transaction information recorded in the blockchain apparatus 111. The document verification processing is described below with reference to FIG. 15. At that time, the type of processing set as document verification, a document hash value acquired in S1615, and the credential information A 408 are passed to the blockchain application 406. In S1617, upon receiving a response indicating a result of the requested processing, the application A 404 determines a verification result. If it is determined that verification is successful (YES in S1617), the application A 404 advances the processing to S1613, and, if it is determined that verification is failed (NO in S1617), the application A 404 advances the processing to S1614.

In S1613, the application A 404 displays a standard dialog (not illustrated) displaying a message indicating that, for example, verification is successful. In S1614, the application A 404 displays a standard dialog (not illustrated) displaying a message indicating that verification is failed or verification is unable to be performed. After displaying the applicable message in S1613 or S1614, the application A 404 ends the present flowchart in response to an instruction to close the dialog being issued by the user.

In this way, if processing operations in S1608 to S1612 are performed, in a case where a plurality of embedded images is included in a paper document, it becomes possible to repeatedly perform reading of a code, acquisition of a hash value by code analysis, and verification of a hash value. Then, in a case where at least one code included in a paper document is successful in verification of a hash value in S1611, it is possible to determine that verification processing of the paper document is successful. With this processing, even if an unreadable code or a code ineffective in the blockchain service is included in the paper document, it is possible to read another code included in the paper document and verify the presence or absence of registration thereof with the blockchain service.

While, here, an example in which processing operations in S1609 to S1612 are performed for each code included in a paper document has been described, a plurality of codes can be collectively read and analyzed to acquire hash values. Moreover, in a case where a code ineffective in the blockchain service is included in a paper document, a plurality of types of hash values may be acquired by reading and analyzing codes. In that case, verification of the acquired plurality of hash values can be individually or collectively performed by the blockchain service and, if verification is successful in at least one hash value, processing in S1613 can be performed.

Figure 15:
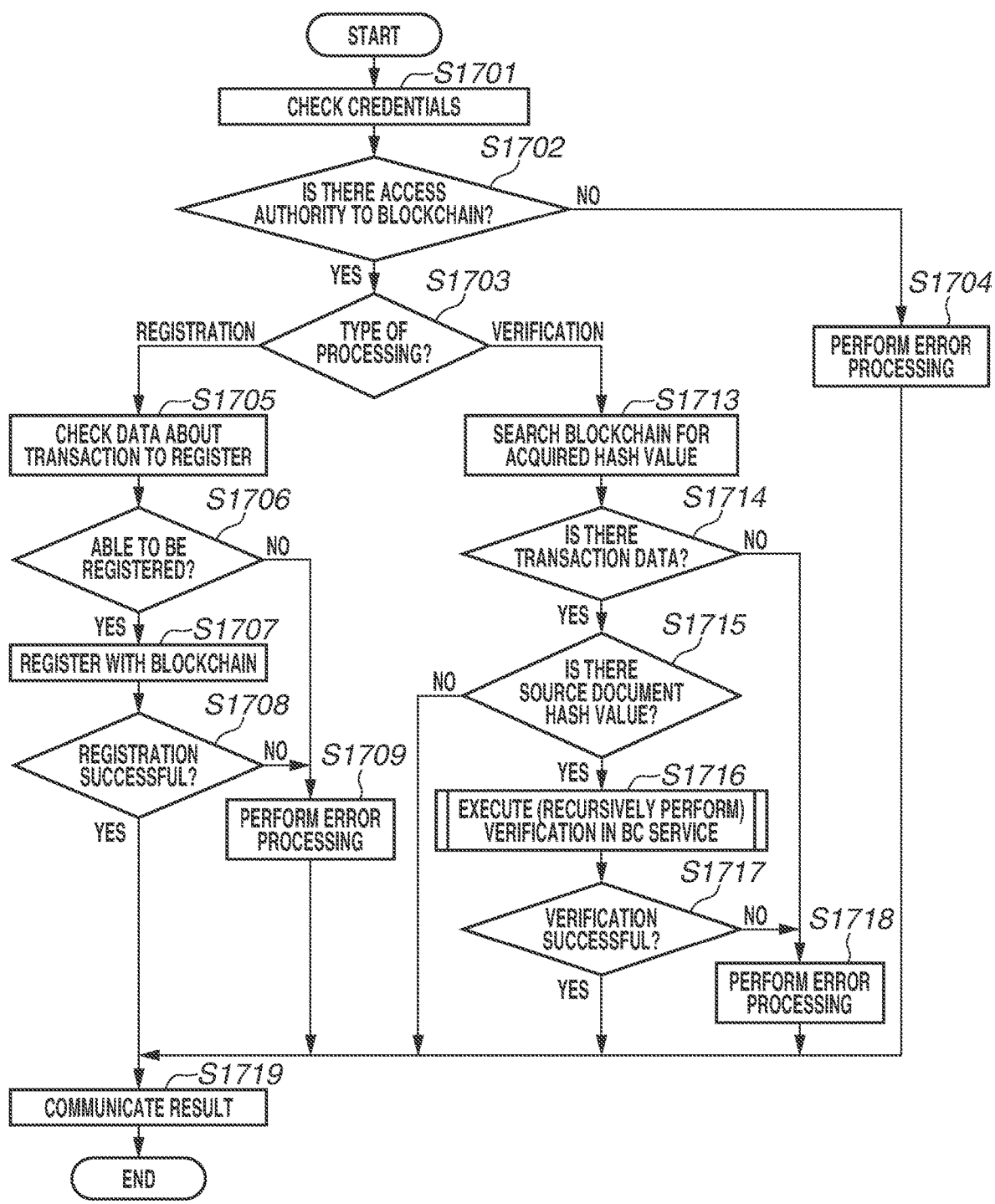
FIG. 15 is a flowchart illustrating transaction processing on the blockchain apparatus.

FIG. 15 is a flowchart illustrating transaction processing which the blockchain application 406 of the image forming apparatus 101 performs on the blockchain apparatus 111. The present flowchart is activated and executed as the blockchain application 406 during processing operations performed by the application A 404 illustrated in FIG. 13A to FIGS. 13F1 and 13F2 and FIG. 14.

At the time of starting of the present flowchart, the blockchain application 406 receives, from the application A 404, the type of processing to be performed on the blockchain apparatus 111 and information required for each type of processing. The information required for each type of processing is the transaction 601 at the time of transaction registration, and is the document hash value 602 required for verification at the time of document verification.

In S1701, the blockchain application 406 passes the credential information C 407 and the credential information A 408 to the blockchain apparatus 111 to check the correctness of credential information. Here, credential information acquired from the credential information management unit 410 at the time of start-up of the blockchain application 406 is used as the credential information C 407, and credential information acquired from the application A 404 is used as the credential information A 408.

In S1702, the blockchain application 406 determines whether the credential information checked in S1701 is correct credential information. With respect to determination as to whether the checked credential information is correct credential information, in a case where the credential information is a digital certificate, when the certificate is verified and verification is successful, the blockchain application 406 determines that the checked credential information is correct credential information. Moreover, in a case where the credential information is a predetermined data value, when the values match each other, the blockchain application 406 determines that the checked credential information is correct credential information. If it is determined that the checked credential information is correct credential information, since there is an authority to access the blockchain apparatus 111 (YES in S1702), the blockchain application 406 advances the processing to S1703, and, if it is determined that the checked credential information is not correct credential information (NO in S1702), the blockchain application 406 advances the processing to S1704. In S1703, the blockchain application 406 determines the received type of processing. If it is determined that the received type of processing is transaction registration (REGISTRATION in S1703), the blockchain application 406 advances the processing to S1705, and, if it is determined that the received type of processing is document verification (VERIFICATION in S1703), the blockchain application 406 advances the processing to S1713.

In S1704, the blockchain application 406 generates error information indicating that an access authority to the blockchain apparatus 111 is not satisfied in the present flowchart. In S1705, the blockchain application 406 determines whether the transaction information received at the time of start-up of processing is complete. Moreover, the blockchain application 406 searches the blockchain apparatus 111 to check whether the document hash value 602 is still not registered in the blockchain apparatus 111 and whether the source document hash value 607 is previously registered in the blockchain apparatus 111. In a case where the transaction information is not complete or the hash values are not in the respective correct states, the transaction information is invalid information. In S1706, the blockchain application 406 determines the result of checking in S1705, and, if it is determined that the transaction information is valid (YES in S1706), the blockchain application 406 advances the processing to S1707, and, if it is determined that the transaction information is invalid information (NO in S1706), the blockchain application 406 advances the processing to S1709 for error processing.

In S1707, the blockchain application 406 requests the blockchain apparatus 111 to register the checked transaction 601. In this operation, the blockchain application 406 receives success or failure as a result of the registration processing from the blockchain apparatus 111. In S1708, the blockchain application 406 determines the result of the registration processing received from the blockchain apparatus 111, and, if it is determined that the result is failure (NO in S1708), the blockchain application 406 advances the processing to S1709 for error processing, and, if it is determined that the result is success (YES in S1708), the blockchain application 406 advances the processing to S1719. In S1709, the blockchain application 406 generates error information indicating that the transaction registration is not able to be performed in the present flowchart.

In S1713, the blockchain application 406 searches the blockchain apparatus 111 to acquire a transaction which holds the hash value received at the time of start-up of processing as a document hash value. In S1714, the blockchain application 406 determines a result of the searching, and, if it is determined that transaction data has been acquired (YES in S1714), the blockchain application 406 determines that the received hash value is a valid hash value and advances the processing to S1715, and, if it is determined that no transaction data has been acquired (NO in S1714), the blockchain application 406 determines that the received hash value is an invalid hash value and advances the processing to S1718 for error processing.

In S1715, the blockchain application 406 determines whether the transaction acquired in S1713 contains a source document hash value. If it is determined that the acquired transaction contains no source document hash value (NO in S1715), since the hash value acquired in S1713 indicates a leading document, the blockchain application 406 terminates verification processing and then advances the processing to S1719. If it is determined that the acquired transaction contains a source document hash value (YES in S1715), since it is necessary to check the presence of a source document corresponding to the source document hash value, the blockchain application 406 advances the processing to S1716.

In S1716, the blockchain application 406 designates document verification as the type of processing and a source document hash value as the information required for processing, and recursively executes the present flowchart of FIG. 15. In S1717, the blockchain application 406 determines a result of this verification, and, if it is determined that verification including that of a source document is successful (YES in S1717), the blockchain application 406 advances the processing to S1719. If it is determined that the verification is failed (NO in S1717), the blockchain application 406 advances the processing to S1718 for error processing. In S1718, the blockchain application 406 generates error information indicating that the document verification is failed in the present flowchart.

In S1719, as information obtained when processing is successful for each type of processing, the blockchain application 406 communicates, to processing serving as an invoker, a registration completion status in the case of transaction registration and a verification success status in the case of document verification. The blockchain application 406 communicates, to processing serving as an invoker, the acquired transaction information in the case of transaction acquisition and error information in the case of error processing being performed.

As described above, according to the present exemplary embodiment, the image forming apparatus 101 is enabled to appropriately use a blockchain service and is further enabled to embed a plurality of pieces of inquiry information in a printed product.

According to the above-described exemplary embodiment, it is possible to provide an image forming apparatus which cooperates with a blockchain service and reduce the possibility of information registered with the blockchain service recorded on a printed product becoming unable to be read when the printed product is scanned.

OTHER EMBODIMENTS

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-180572, which was filed on Oct. 28, 2020 and which is hereby incorporated by reference herein in its entirety.

What is claimed is:

1. An image forming apparatus that cooperates with a management service which receives a document via a network and stores the document and a blockchain service which manages document information about the document on a block-by-block basis and, upon defining association of each block with a previous and/or subsequent block, manages a plurality of blocks with a plurality of nodes, the image forming apparatus comprising:
one or more processors; and
at least one memory coupled to the one or more processors and having stored thereon instructions, which when executed by the one or more processors, cause the image forming apparatus to:
generate, in printing a document stored in the management service, an embedded image from document information about the document;
acquire an embedding setting for use in embedding the embedded image in the document;
output a printed product with the document information recorded thereon by performing printing of the document with the embedded image embedded therein based on the embedding setting; and
register the document information with the blockchain service in conjunction with the printed product being output,
wherein while the embedding setting includes a setting for embedding a plurality of embedded images in the document and the image forming apparatus outputs a printed product with a plurality of embedded images embedded therein,
the registration unit registers the document information with the blockchain service in such a way as to prevent the document information from being registered in an overlapping manner in registering the document information in conjunction with the printed product with a plurality of embedded images embedded therein being output, and
wherein, in a case where a minimum required number of embedded images that needs to be embedded in the document exceeds a maximum allowable number of embedded images allowed to be embedded in the document, buttons for shifting to a screen for making print settings and a screen for adjusting a number of embedded images are output as an error screen.

2. The image forming apparatus according to claim 1, wherein the instructions, when executed by the one or more processors, further cause the printing image forming apparatus to:
scan the printed product placed on the image forming apparatus, decode an embedded image included in the printed product, acquire the document information recorded on the printed product, check whether the document information is registered with the blockchain service, and verify whether the printed product is a valid printed product, and
while detecting a plurality of embedded images from an image obtained by scanning the printed product, check whether the document information is registered with the blockchain service at a point of time having decoded at least one barcode from the plurality of embedded images.

3. The image forming apparatus according to claim 1, wherein the instructions, when executed by the one or more processors, further cause the printing image forming apparatus, in a case where an instruction for registering the document information with the blockchain service in printing the document has been received from the user, to register the document information with the blockchain service and perform printing for embedding the plurality of same embedded images in the document based on the embedding setting.

4. The image forming apparatus according to claim 1, wherein the embedding setting is determined by an instruction being received from the user via an embedding setting screen, or is determined based on at least one of device setting which is previously set in the image forming apparatus, blockchain setting which a program conforming to the blockchain service holds, and service setting which the blockchain service holds.

5. The image forming apparatus according to claim 4, wherein the blockchain setting includes at least embedding processing conforming to setting of a security policy.

6. The image forming apparatus according to claim 1, wherein the instructions, when executed by the one or more processors, further cause the printing image forming apparatus to determine whether embedded images the number of which corresponds to a determined number of embedding portions are able to be embedded in positions available for embedding in the document targeted for printing, based on at least one of device setting which is previously set in the image forming apparatus, blockchain setting which a program conforming to the blockchain service holds, and service setting which the blockchain service holds,
wherein, in a case where it is determined that embedding is not able to be performed, the image forming apparatus performs error processing.

7. The image forming apparatus according to claim 6, wherein the instructions, when executed by the one or more processors, further cause the printing image forming apparatus to, after the embedding setting is determined, determine whether the positions of embedded images to be embedded in the document satisfy a condition of positions,
wherein, in a case where it is determined that the positions do not satisfy the condition of positions, the image forming apparatus performs warning processing.

8. The image forming apparatus according to claim 1, wherein the image forming apparatus is a printer capable of printing the document and scanning a printed product.

9. A control method for an image forming apparatus that cooperates with a management service which receives a document via a network and stores the document and a blockchain service which manages document information about the document on a block-by-block basis and, upon defining association of each block with a previous and/or subsequent block, manages a plurality of blocks with a plurality of nodes, the control method comprising:
in printing a document stored in the management service, generating an embedded image from document information about the document;
acquiring an embedding setting for use in embedding the embedded image in the document;
outputting a printed product with the document information recorded thereon by performing printing of the document with the embedded image embedded therein based on the embedding setting; and
registering the document information with the blockchain service in conjunction with the printed product being output,
wherein while the embedding setting includes a setting for embedding a plurality of same embedded images in the document and the printing outputs a printed product with a plurality of embedded images embedded therein, the registering registers the document information with the blockchain service in such a way as to prevent the document information from being registered in an overlapping manner in registering the document information in conjunction with the printed product with a plurality of embedded images embedded therein being output, and
wherein, in a case where a minimum required number of embedded images that needs to be embedded in the document exceeds a maximum allowable number of embedded images allowed to be embedded in the document, buttons for shifting to a screen for making print settings and a screen for adjusting a number of embedded images are output as an error screen.

10. A non-transitory computer-readable storage medium storing computer-executable instructions that, when executed by a computer, cause the computer to perform a control method for an image forming apparatus that cooperates with a management service which receives a document via a network and stores the document and a blockchain service which manages document information about the document on a block-by-block basis and, upon defining association of each block with a previous and/or subsequent block, manages a plurality of blocks with a plurality of nodes, the control method comprising:
in printing a document stored in the management service, generating an embedded image from document information about the document;
acquiring an embedding setting for use in embedding the embedded image in the document;
outputting a printed product with the document information recorded thereon by performing printing of the document with the embedded image embedded therein based on the embedding setting; and
registering the document information with the blockchain service in conjunction with the printed product being output,
wherein while the embedding setting includes a setting for embedding a plurality of same embedded images in the document and the printing outputs a printed product with a plurality of embedded images embedded therein, the registering registers the document information with the blockchain service in such a way as to prevent the document information from being registered in an overlapping manner in registering the document information in conjunction with the printed product with a plurality of embedded images embedded therein being output, and
wherein, in a case where a minimum required number of embedded images that needs to be embedded in the document exceeds a maximum allowable number of embedded images allowed to be embedded in the document, buttons for shifting to a screen for making print settings and a screen for adjusting a number of embedded images are output as an error screen.

* * * * *